US007910879B2

(12) United States Patent
Sato et al.

(10) Patent No.: US 7,910,879 B2
(45) Date of Patent: *Mar. 22, 2011

(54) METHOD AND APPARATUS FOR TIME-OF-FLIGHT MASS SPECTROMETRY

(75) Inventors: Takaya Sato, Tokyo (JP); Michisato Toyoda, Osaka (JP); Morio Ishihara, Osaka (JP)

(73) Assignee: JEOL Ltd., Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 12/390,710

(22) Filed: Feb. 23, 2009

(65) Prior Publication Data

US 2009/0212208 A1 Aug. 27, 2009

Related U.S. Application Data

(62) Division of application No. 10/592,299, filed as application No. PCT/JP2005/008951 on May 17, 2005, now Pat. No. 7,504,620.

(30) Foreign Application Priority Data

May 21, 2004 (JP) ................................ 2004-151473
Apr. 28, 2005 (JP) ................................ 2005-131106

(51) Int. Cl.
*B01D 59/44* (2006.01)
*H01J 49/40* (2006.01)

(52) U.S. Cl. ......... 250/287; 250/286; 250/281; 315/503

(58) Field of Classification Search .................. 250/281, 250/282, 286, 287, 297, 299, 396 R, 397; 315/500–505

See application file for complete search history.

(56) References Cited

U.S. PATENT DOCUMENTS

| | | | | |
|---|---|---|---|---|
| 6,828,553 | B2 | 12/2004 | Weiss | |
| 6,949,738 | B2 | 9/2005 | Yamaguchi et al. | |
| 7,186,972 | B2 * | 3/2007 | Farnsworth | 250/287 |
| 7,196,324 | B2 | 3/2007 | Verentchikov | |
| 7,482,583 | B2 * | 1/2009 | Ueno | 250/287 |
| 7,504,620 | B2 * | 3/2009 | Sato et al. | 250/287 |
| 2005/0087684 | A1 * | 4/2005 | Farnsworth | 250/287 |
| 2005/0285030 | A1 * | 12/2005 | Farnsworth | 250/287 |

FOREIGN PATENT DOCUMENTS

| | | |
|---|---|---|
| JP | 11-195398 | 7/1999 |
| JP | 2000-243345 | 9/2000 |
| JP | 2003-086129 | 3/2003 |

OTHER PUBLICATIONS

Daisuke Okumura et al., "A Simple Multi-Turn Time of Flight Mass Spectrometer 'MULTUM II'," J. Mass. Spectrom. Soc. Jpn., vol. 51, No. (No. 2) 2003, pp. 349-353.

* cited by examiner

*Primary Examiner* — Bernard E Souw
(74) *Attorney, Agent, or Firm* — The Webb Law Firm

(57) ABSTRACT

A method and apparatus for time-of-flight (TOF) mass spectrometry. The apparatus improves the ion focusing properties in an orthogonal direction and permits connection with an orthogonal-acceleration ion source for improvement of sensitivity. The apparatus comprises an ion source for emitting ions in a pulsed manner, an analyzer for realizing a helical trajectory, and a detector for detecting the ions. The analyzer is composed of plural laminated toroidal electric fields to realize the helical trajectory.

12 Claims, 30 Drawing Sheets

| DIFFERENCE OF MATSUDA PLATE (OUTER ELECTRODE SIDE-INNER ELECTRODE SIDE) | Loc' mm |
|---|---|
| 0.1 | 0.2 |
| 0.3 | 0.6 |
| 0.5 | 1.0 |
| 0.7 | 1.4 |
| | |

AFTER DELAY TIME (SEVERAL HUNDRED ns)

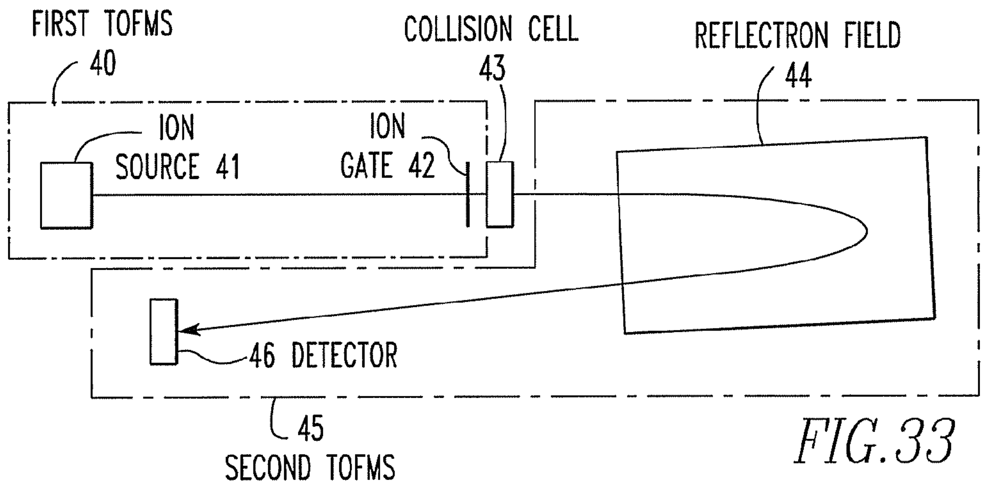
FIG. 33
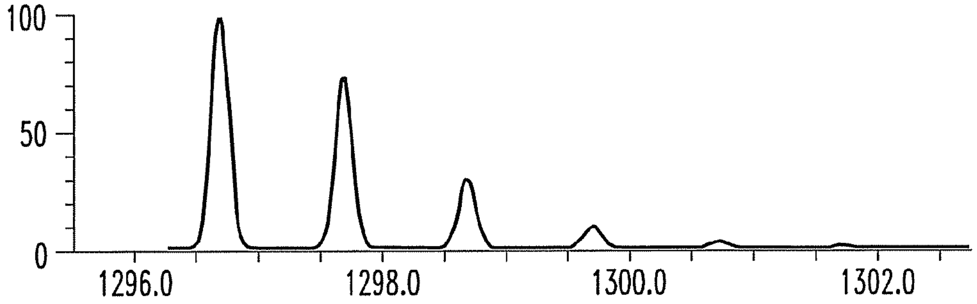
FIG. 34
| MASSES OF PRODUCT IONS | INTENSITY RATIOS |
|---|---|
| m | Rm |
| m+1 | Rm+1 |
FIG. 35
| MASSES OF NEUTRAL PARTICLES | INTENSITY RATIOS |
|---|---|
| n | Rn |
| n+1 | Rn+1 |
FIG. 36
| MASSES OF PRECURSOR | COMBINATIONS | FLIGHT TIME THROUGH TOF1 | FLIGHT TIME THROUGH TOF2 | INTENSITY RATIOS |
|---|---|---|---|---|
| M | (1) m,n | T1, M | T2, m | Rm x Rn |
| M+1 | (2) m, n+1 | T1, M+1 | T2, m | Rm X Rn+1 |
| | (3) m+1, n | T1, M+1 | T2, m+1 | Rm+1 x Rn |
| M+2 | (4) m+1, n+1 | T1, M+2 | T2, m+1 | Rm+1 X Rn+1 |
FIG. 37

METHOD AND APPARATUS FOR TIME-OF-FLIGHT MASS SPECTROMETRY

TECHNICAL FIELD

The present invention relates to a method and apparatus for time-of-flight (TOF) mass spectrometry.

BACKGROUND

(a) Time-Of-Flight Mass Spectrometer (TOF-MS)

A TOF-MS finds the mass-to-charge ratio (m/z) of sample ions by measuring the time taken for the ions to travel a given distance, based on the principle that the sample ions accelerated with a constant acceleration voltage have a flight velocity corresponding to the m/z. The principle of operation of the TOF-MS is illustrated in FIG. 26. The illustrated spectrometer has a pulsed ion source 5 composed of an ion generation portion 6 and a pulsed voltage generator 7.

Ions i present within the electric field are accelerated by the acceleration voltage generator 7. The accelerating voltage is a pulsed voltage. Acceleration caused by the acceleration voltage and time measurement performed by an ion detector system (including detector 9) are synchronized. Simultaneously with the acceleration caused by the accelerating voltage generator 7, the ion detector 9 starts to count the time. When the ions reach the ion detector 9, the detector 9 measures the flight time of the ions i. Generally, the flight time increases with increasing m/z. Ions having small values of m/z reach the detector 9 earlier and thus have shorter flight times.

The mass resolution of the TOF-MS is given by $$\text{mass resolution} = \frac{T}{2\Delta T} \qquad (1)$$

where T is the total flight time and ΔT is the peak width. That is, there are two major factors resulting in the peak width ΔT in the spectrum. One factor is the time focusing (ΔTf). The other factor is the response (ΔTd) of the detector. Assuming that both factors show a Gaussian distribution, Eq. (1) is given by $$\text{Mass resolution} = T/2\sqrt{(\Delta T_f^2 + \Delta T_d^2)} \qquad (2)$$

If the peak width ΔT is made constant and the total flight time T can be elongated, the mass resolution can be improved. In practice, the response of the detector 9 is approximately 1 to 2 nsec. Therefore, the peak width ΔT is not reduced further.

A linear TOF-MS is very simple in structure. However, the total flight time T is on the order of tens of microseconds. That is, a very long total flight time cannot be achieved. Consequently, the mass resolution is not so high. One advantage of the linear type is that fragment ions produced during flight are almost identical in velocity with ions not yet fragmented (precursor ions). This makes it possible to read information only about the precursor ions from the mass spectrum.

FIG. 27 is a diagram illustrating the principle of operation of the reflectron TOF-MS. Identical components are indicated by identical symbols in both FIGS. 26 and 27. In the reflectron TOF-MS, an intermediate focal point is placed between the pulsed ion source 5 and a reflectron electric field 8. Time focusing is once done. Then, energy focusing is realized by the reflectron electric field 8 and the remaining free space. Thus, the total flight time can be prolonged to about 50 μsec without increasing the spectral peak width ΔT.

A point to be noticed in reflectron TOF-MS is the behavior of ions fragmented during flight. Since fragment ions are substantially identical in velocity with precursor ions, the kinetic energy of fragment ions is given by $$Up \times \frac{Mf}{Mp}$$

where Mf is the mass of the fragment ions, Mp is the mass of the precursor ions, and Up is the kinetic energy of the precursor ions. Therefore, depending on the mass Mf, kinetic energy differences much larger than the distribution of the initial kinetic energies of ions are produced. Since fragment ions are smaller in kinetic energy than precursor ions, the fragment ions make a turn earlier than the precursor ions within the reflectron field and reach the detector 9. This complicates the mass spectrum.

(b) Multi-Turn TOF-MS

In the prior-art linear and reflectron types of TOF-MS, increasing the total flight time T, i.e., increasing the total flight distance, immediately leads to an increase in the size of the apparatus. An apparatus that has been developed to avoid increase in size of the apparatus and to realize high mass resolution is the multi-turn TOF-MS. The multi-turn TOF-MS is composed of plural electric sector fields, and ions are made to make multiple revolutions.

Multi-turn TOF-MS instruments are roughly classified into multi-turn TOF-MS in which ions repeatedly follow the same trajectory and helical-trajectory TOF-MS in which the ion beam is made to describe a helical trajectory by shifting the trajectory plane every revolution. The total flight time T can be increased to milliseconds to hundreds of milliseconds, which may differ according to the flight distance per revolution and on the number of revolutions. High mass resolution can be accomplished with improved space saving design compared with the conventional linear and reflectron types of TOF-MS.

The multi-turn type is characterized in that ions are made to turn multiple times on a closed circulation trajectory. FIG. 28 illustrates the principle of operation of the multi-turn TOF-MS. In this apparatus, ions ejected from a pulsed ion source 10 are made to make many revolutions on an 8-shaped circuit trajectory formed by 4 toroidal electric fields. After the multiple turns, the ions are detected by a detector 15 (see, for example, non-patent reference 1). In this apparatus, 4 toroidal electric fields 12 are used. Each toroidal electric field is produced by combining a Matsuda plate with a cylindrical electric field. Thus, the 8-shaped circuit trajectory is created. Ions are made to turn multiple times on the trajectory, thus increasing the total flight time T.

Furthermore, this apparatus adopts an ion optical system that can fully satisfy the spatial focusing conditions and time focusing conditions whenever a revolution is made without depending on the initial position, initial angle, or initial energy (see, for example, patent reference 1). Therefore, the flight time can be prolonged without increasing time and spatial aberrations by causing ions to make multiple turns. The multi-turn type can realize space saving and high mass resolution but there is the problem that ions with small masses (having high velocities) surpass ions with large masses (having small velocities) because ions are made to repeatedly follow the same trajectory. This creates the disadvantage that the mass range is narrowed.

The helical-trajectory TOF-MS is characterized in that the trajectory is shifted in a direction perpendicular to the circulation trajectory plane whenever one revolution is made, thus realizing a helical trajectory. In one feature of this helical-trajectory TOF mass spectrometer, the starting and end points of the closed trajectory are shifted perpendicularly to the trajectory plane. To realize this, some methods are available. In one method, ions are introduced obliquely from the beginning (see, for example, patent reference 3). In another method, the starting and end points of the closed trajectory are shifted in the vertical direction using a deflector (see, for example, in patent reference 3). When viewed from a certain direction, the helical-trajectory TOF-MS is the same as the multi-turn TOF-MS. Whenever one revolution is made, ions are made to descend, i.e., moved downward. As a whole, a helical trajectory is accomplished. This apparatus can solve the problem with the multi-turn TOF-MS (i.e., overtaking). However, the number of turns is restricted physically. Consequently, the mass resolution has an upper limit.

Fragment ions produced by fragmentation during flight cannot reach the detector, because electric sector fields act as kinetic energy filters. Therefore, a mass spectrum completely unaffected by fragment ions can be derived.

(c) MALDI (Matrix Assisted Laser Desorption/Ionization) and Delayed Extraction Technique The MALDI is a method of vaporizing or ionizing a sample by mixing the sample into a matrix (such as liquid or crystalline compound or metal powder) having an absorption band at the wavelength of the used laser light, dissolving the sample, solidifying it, and illuminating the solidified mixture with laser light. In an ionization process which uses a laser and is typified by the MALDI, the initial energy distribution is wide when ions are created. To time focus the distribution, delayed extraction technique is used in most cases. This method consists of applying a pulsed voltage with a delay of tens of nanoseconds from laser irradiation.

FIG. 29A conceptually illustrates a general MALDI ion source and delayed extraction technique. The MALDI is a method of vaporizing or ionizing a sample 30 by mixing the sample into a matrix having an absorption band at the wavelength of the used laser light, dissolving the sample, solidifying it, and illuminating the solidified mixture with laser light. The sample 30 is adhered to the sample plate 20. A lens 1 (also indicated by numeral 23) receives the laser light. The light from the lens 1 is reflected by a mirror 24. The light reflected by the mirror 24 is made to hit the sample 30. As a result, the sample 30 is excited, producing ions. The ions are accelerated by accelerating electrodes 21 and 22 and introduced into a mass analyzer region.

A mirror 25, a lens 2, and a CCD camera 27 are disposed to permit observation of the state of the sample 30.

The sample 30 is mixed and dissolved in the matrix. The matrix is solidified. The solidified matrix is placed on the sample plate 20. Laser light is directed at the sample 30 through the lens 1 and mirror 24, vaporizing or ionizing the sample 30. The generated ions are accelerated by the accelerating electrodes 1 and 2 (21 and 22) and introduced into a TOF-MS. An electric potential gradient having a tilt as shown in (a) is applied between the accelerating electrodes 2 and 1 (22 and 21). After a delay of hundreds of nanoseconds, the potential gradient assumes the form as shown in FIG. 29B.

FIG. 30 is a diagram illustrating a time sequence using the prior-art delayed extraction technique. (a) indicates a laser beam. (b) indicates the electric potential at the accelerating electrode 1. (c) indicates measurement of the flight time. First, the accelerating electrode 1 and sample plate 20 are made equipotential. Then, the laser oscillates at instant t0. At instant t1, i.e., with a delay of hundreds of nanoseconds after receiving a notice signal from the laser indicating the oscillation, the voltage at the accelerating electrode 1 is varied from Vs to V1 at high speed. A potential gradient is created between the sample plate 20 and the accelerating electrode 1 to accelerate the ions. The potential at the accelerating electrode 1 returns from V1 to Vs at instant t2. Measurement of the flight time is started at instant t1 that is on the leading edge of the pulsed voltage. The measurement of the flight time ends at instant t3.

(d) Orthogonal Acceleration

In MALDI, ions are generated in a pulsed manner and so MALDI has very good compatibility with TOF-MS. However, there are numerous mass spectrometry ionization methods that produce ions continuously such as EI, CI, ESI, and APCI. Orthogonal acceleration has been developed to combine such an ionization method and TOF-MS.

FIG. 31 is a conceptual diagram of TOF-MS using orthogonal acceleration. This mass spectrometry is abbreviated oa-TOF-MS or oa-TOFMS. An ion beam produced from an ion source 31 that generates ions continuously is continuously transported into an orthogonal acceleration portion 33 with kinetic energy of tens of eV. In the orthogonal acceleration portion 33, a pulse generator 32 applies a pulsed voltage of tens of kV to accelerate the ions in a direction orthogonal to the direction of transportation from the ion source 31. The ions entering a reflectron field 34 are reflected by the reflectron field 34. In this way, the arrival time from the instant at which the pulsed voltage is started to be applied to the instant at which the ions arrive at the detector 35 is made different among different masses of ions. Consequently, mass separation is performed.

(e) MS/MS Measurement and TOF/TOF Equipment

In general mass spectrometry, ions generated from an ion source are mass separated by a mass spectrometer to obtain a mass spectrum. Information obtained at this time is only m/z values. This measurement is herein referred to as MS measurement in contrast to MS/MS measurement. In the MS/MS measurement, certain ions (precursor ions) generated from an ion source spontaneously fragment or are forcedly fragmented. The resulting product ions are observed.

In this measurement, information about the mass of the precursor ions and information about the masses of product ions produced along plural paths are obtained. Consequently, the information about the structure of the precursor ions can be obtained. FIG. 32 is a diagram illustrating MS/MS measurement. Precursor ions break into product ions 11, 12, 13, and so on. The structural analysis of the precursor ions is enabled by mass analyzing all the product ions.

A system consisting of two TOF-MS units connected in tandem is generally known as TOF/TOF equipment or TOF/TOF system and principally used in equipment making use of a MALDI ion source. The TOF/TOF equipment is composed of a linear TOF-MS and a reflectron TOF-MS. FIG. 33 conceptually illustrates MS/MS equipment in which the TOF- MS units are connected in tandem. In this example, the equipment consists of a linear TOF-MS 40 (first TOF-MS unit) and a reflectron TOF-MS 45 (second TOF-MS unit).

Ions exiting from an ion source 41 within the first TOF-MS unit pass through an ion gate 42 for selecting precursor ions. The time focal point of the first TOF-MS unit is placed near the ion gate 42. The precursor ions enter a collision cell 43, where they are fragmented. Then, the fragment ions enter the second TOF-MS unit. The kinetic energies of the product ions produced by the fragmentation are distributed in proportion to the masses of the product ions and given by $$Up = Ui \times \frac{m}{M} \tag{3}$$

where Up is the kinetic energy of the product ions, Ui is the kinetic energy of the precursor ions, m is the mass of the product ions, and M is the mass of the precursor ions. In the second TOF-MS unit including a reflectron field, the flight time is different according to mass and kinetic energy. Therefore, product ions can be detected by a detector 46 and mass analyzed.

As one feature of the multi-turn TOF-MS is that an optical system is known which can fully satisfy the spatial and time focusing conditions without depending on the initial position, initial angle, or initial energy (see, for example, Patent reference 1).

[Non-patent reference 1] Journal of the Mass Spectrometry Society of Japan, Vol. 51, No. 2 (No. 218), 2003, pp. 349-353

[Patent reference 1] Japanese patent laid-open No. H11-195398 (pages 3-4, FIG. 1)

[Patent reference 2] Japanese patent laid-open No. 2000-243345 (pages 2-3, FIG. 1)

[Patent reference 3] Japanese patent laid-open No. 2003-86129 (pages 2-3, FIG. 1)

SUMMARY OF THE INVENTION

The prior-art helical-trajectory TOF-MS has the following problems. The apparatus described in patent reference 2 does not have a function of focusing ions in the orthogonal direction and so the ions are not focused spatially or in time in the orthogonal direction due to velocity distribution of the circulating ions in the orthogonal direction. This leads to deteriorations of the sensitivity and mass resolution. Furthermore, if the velocities are widely distributed in the orthogonal direction, there is the possibility that the number of turns at the detected surface deviates from the correct number. On the other hand, in the technique described in patent reference 2, the spread in the orthogonal direction is suppressed by deflectors. To enhance the focusing in the orthogonal direction, it is necessary to increase the number of deflectors on the ion trajectory. If the number of deflectors is increased, however, more elements must be adjusted, complicating the equipment.

Accordingly, it is a first object of the present invention to provide a TOF-MS which improves focusing of revolving ions in the orthogonal direction and which permits connection with an orthogonal-acceleration ion source for improvement of sensitivity.

The MALDI using delayed extraction technique has the following disadvantages. 1) As the distance to the time focal point is increased, the dependence of the mass resolution on m/z increases. 2) The mass accuracy deteriorates over a wide range of m/z values. 3) High and accurate pulsed voltages having high time accuracy are necessary.

The mass resolution of TOF-MS is given by Eq. (2) above. In the case of the linear TOF-MS, a detector is placed at the time focal point. Therefore, if the distance to the time focal point is shortened, the total flight time T is shortened. The mass resolution deteriorates. Consequently, the aforementioned problems cannot be solved.

In the case of the reflectron TOF-MS, a time focal point is once created near the ion source. If kinetic energy focusing is realized in the reflectron field, the distance to the time focal point can be shortened. Consequently, the problems of the dependence of the mass resolution on mass and mass accuracy can be solved to some extent. However, the total flight time T cannot be set to a large value unless the equipment is made large. For this reason, in order to improve the mass resolution, some extent of time focusing (bringing ΔTf close to 0) at the detection surface is necessary. Where delayed extraction technique is not used, ions with high masses show a wide distribution of initial energies. Therefore, if the distance from the ion source to the intermediate focal point is shortened, the ΔTf becomes equivalent to or greater than ΔTd. In consequence, the present situation is that the delayed extraction technique must be used in practice.

It is a second object of the invention to provide a method of realizing a small-sized, high-mass resolution, MALDI TOF-MS instrument without using delayed extraction technique by using MALDI as its ionization method and a multi-turn TOF-MS unit as its mass analyzer region.

The multi-turn TOF-MS is characterized in that it can adopt an ion optical system capable of fully satisfying the spatial and time focusing conditions without depending on initial position, initial angle, or initial energy (see, for example, patent reference 1). That is, the initial time width assumed when ions enter the multi-turn trajectory can be almost completely maintained even after some turns. Furthermore, the total flight time T can be increased in proportion to the number of turns (a factor of 10 to hundreds over the reflectron TOF-MS).

Therefore, high-mass resolution can be achieved without using delayed extraction technique even if ΔTf spreads somewhat by minimizing the distance from the ion source to the multi-turn TOF-MS unit. In addition, it is not necessary to use pulsed voltages because delayed extraction technique is not used. Further, the multi-turn TOF-MS uses electric sector fields. This permits measurements not affected by fragment ions.

Harmful effects produced when plural isotope peaks are selected in TOF/TOF equipment are next described. Since carbon, oxygen, nitrogen, and hydrogen constituting sample ions have their respective isotopes, plural mass species of sample ions are present depending on their combinations. Peaks which appear in the mass spectrum and which originate from the same molecules having different masses are generally known as “isotope peaks”.

FIG. 34 illustrates isotope peaks and shows an example of angiotensin I ($C_{62}H_{90}N_{17}O_{14}$). Peak value is plotted on the vertical axis, while m/z value is on the horizontal axis. It can be seen from FIG. 34 that plural peaks are present at intervals of units (unit is a mass unit defined such that the mass of $^{12}C$ is 12 unit). Among them, peaks of the smallest masses each consisting of only a single isotope such as $^{12}C$, $^{16}O$, $^{14}N$, and $^{1}H$ are known as “monoisotopic peaks”.

Where the linear TOF-MS unit is adopted in the first TOF-MS unit like in the prior art, the flight distance can be increased only up to hundreds of mm. With these flight distances, the flight time difference between adjacent isotope peaks is less than 10 nsec. Where the speed at which the ion gate is switched is considered, it is impossible to seek for high selectivity. It follows that plural isotope peaks are passed. If plural isotope peaks are selected, a great problem occurs as described below.

If the second TOF-MS unit (see FIG. 33) including a reflectron field completely satisfies the energy focusing conditions (i.e., the flight time is not affected by the kinetic energies of product ions), the time taken to travel across the first TOF-MS unit depends on the m/z values of the precursor ions. The time taken to travel across the second TOF-MS unit depends on the m/z values of the product ions. For the sake of simplicity, it is assumed that some monovalent precursor ions break into singly charged product ions and neutral particles each of which has two isotope species.

FIG. 35 illustrates the isotope peaks of the product ions. FIG. 36 illustrates the isotope peaks of the neutral particles. In FIG. 35, the relation between mass and intensity ratio of each product ion is shown. In FIG. 36, the relation between mass and intensity ratio of each neutral particle is shown.

Before the fragmentation, the product ions and neutral particles have been bonded and so there are four combinations of precursor ions. FIG. 37 illustrates the isotope peaks of precursor ions. It can be seen that the combinations are four: 1)-4). In FIG. 37, the masses of precursor ions, combinations, flight time through TOF 1 (TOF-MS unit 1), flight time through TOF 2 (TOF-MS unit 2), and intensity ratios are shown.

Although there are 4 combinations of precursor ions, there are 3 masses, i.e., M, M+1, and M+2 (note that M=m+n). The arrival time to the detector through each fragmentation path is the sum of the flight time T1X of precursor ions having mass X through the first TOF-MS unit and the flight time T2Y of product ions having mass Y through the second TOF-MS unit. The intensity ratio is the product of the intensity ratio of product ion and the intensity ratio of neutral particle in each case.

FIG. 38 shows how these ions appear in a spectrum. FIG. 38 illustrates the harmful effect produced by selecting plural isotope peaks with TOF/TOF equipment. In the figure, ΔT1 indicates the difference in flight time between isotope peaks of precursor ions. ΔT2 indicates the difference in flight time between the isotope peaks of product ions. The flight time difference between product ions k1 and k2 and the flight time difference between product ions k3 and k4 become nonuniform. In reality, each peak has a width and so in some cases, the peak k2 may be located at the tail of the peak k1. In other cases, the peak may form a raised portion of the baseline between the peaks k1 and k3. In any case, product ions cannot be obtained with high mass accuracy.

The problem associated with selection made with TOF/TOF equipment is next described. In the prior art TOF/TOF equipment, precursor ions are selected after forecasting the flight time through the ion gate from the arrival time at the detector. However, where the flight distance is short as in the linear TOF-MS, flight time difference caused by a mass difference is small. Consequently, it is very difficult to forecast the flight time. Especially, where MALDI and delayed extraction technique are adopted, if the delay time is adjusted, the flight time through the ion gate is deviated. For this reason, in the prior-art equipment, the time taken to pass through the ion gate must be set long. This results in a deterioration of the selectivity.

It is a third object of the invention to solve the foregoing problems by using a helical-trajectory TOF-MS unit as its first TOF-MS unit. The most effective method of solving the first problem caused by selecting plural isotope peaks in TOF/TOF equipment is to select only monoisotopic ions. If monoisotopic ions are selected as precursor ions, ions produced from the precursor ions by fragmentation are also only monoisotopic ions. The effects of the isotropic peaks can be eliminated. Consequently, it is easier to interpret the spectrum. In addition, the mass accuracy can be improved.

A helical-trajectory TOF-MS shows time and space focusing whenever one revolution is made. Therefore, an intermediate focal point is once created within the trajectory of the helical-trajectory TOF-MS if either MALDI or orthogonal acceleration is used. The distance is smaller than the distance to the intermediate focal point in a linear TOF-MS. Factors which originate from the ion source and which affect the time focusing at the intermediate focal point such as the delay time in MALDI can be suppressed to equal or lower level.

Since the state at the intermediate focal point can be retained if the number of turns is increased, the flight distance through the first TOF-MS unit can be increased by a factor of about 50 to 100 while maintaining the time focusing properties. That is, the flight time difference between the isotope peaks of precursor ions can be increased by a factor of about 50 to 100. Monoisotopic ions can be selected.

With respect to the problem regarding selection in TOF/TOF equipment, the flight time through the ion gate can be precisely forecasted because the spacing between the isotope peaks broadens and because the detector used in MS measurements can be placed close to the ion gate. Hence, more accurate mass analysis can be performed.

It is a fourth object of the invention to provide a mass spectrometer capable of performing measurements making use of the advantages of a linear TOF-MS unit and the advantages of a helical-trajectory TOF-MS unit by combining these two units.

In principle, linear TOF-MS cannot separate fragment ions and precursor ions. Therefore, the state of ions just accelerated out of the ion source can be measured with high sensitivity. However, high resolution cannot be obtained. Reflectron TOF-MS can obtain resolution that is several times as high as the resolution of linear TOF-MS. However, the resulting spectrum is complicated because the time taken for the ions to pass back through the reflectron field is different between product ions and precursor ions. If the ratio of ions which are fragmented is high, the sensitivity to the precursor ions deteriorates. The prior-art equipment mainly consists of a combination of a linear TOF-MS unit and a reflectron TOF-MS unit.

A helical-trajectory TOF-MS provides a resolution that is more than 10 times as high as the resolution achieved by a linear TOF-MS. In addition, the electric sector field that is a component plays the role of an energy filter. Therefore, it is unlikely that fragment ions reach the detector. Consequently, only ions which are created in the ion source and arrive at the detector can be observed.

Problems with the prior-art technique are described in connection with a helical-trajectory TOF-MS making use of a circulating trajectory (as disclosed in non-patent reference 1). In this description, a multi-turn TOF-MS realizes an 8-shaped circulating trajectory by 4 toroidal electric fields. Each toroidal electric field is created by combining a cylindrical electric field having a center trajectory of 50 mm (having an inner electrode with a radius of 45.25 mm, an outside electrode surface with a radius of 55.25 mm, and an angle of rotation of 157.1°) and two Matsuda plates. The space between the Matsuda plates is 40 mm. The trajectory of one revolution is 1.308 m. The c value (radius of rotation of the center trajectory of ions/radius of curvature of potential in the longitudinal direction of the Matsuda plates) indicative of the curvature of the toroidal electric field is 0.0337 for all the toroidal electric fields.

However, this equipment suffers from the problem of overtaking as mentioned previously. Accordingly, a method of realizing a helical-trajectory TOF-MS is conceivable by shifting the starting and end points of the circulating trajectory for each revolution in a direction orthogonal to the circulating trajectory plane, based on the trajectory in the multi-turn TOF-MS.

FIG. 39 shows an example of the whole configuration of a helical-trajectory TOF-MS. Like components are indicated by like reference numerals in both FIGS. 28 and 39. The spectrometer has a pulsed ion source 10, a detector 15, a laminated toroidal electric field 1 (50), a laminated toroidal electric field 2 (51), a laminated toroidal electric field 3 (52), and a laminated toroidal electric field 4 (53). The spectrometer has a circulating trajectory plane 54. The direction of orthogonal movement is along the Y-axis.

In this case, ions enter the circulating trajectory plane at an incidence angle to the plane and moves at a constant rate in the direction of orthogonal movement. The incidence angle θ can be given by $$\theta = \tan^{-1}\left(\frac{Lv}{Lt}\right) \tag{4}$$

where Lt is the length of the trajectory of one circulation projected on the circulating trajectory plane and Lv is the distance traveled in the orthogonal direction per layer.

A toroidal electric field can consist of a cylindrical electric field in which plural Matsuda plates are disposed at intervals of Lv. This combination of the cylindrical electric field and Matsuda plates is referred to as a laminated toroidal electric field. FIG. 40 shows a laminated toroidal electric field. This corresponds to the laminated toroidal electric field 1 of FIG. 39. Also shown are outer electrodes 55, 56, inner electrodes 57, 58, a shunt 59, and Matsuda plates 60. The number of Matsuda plates is the number of turns (number of laminations) on the helical trajectory plus 1 per laminated toroidal electric field. In the cases of FIGS. 39 and 40, the number of turns (number of laminations) is 15. Each laminated toroidal electric field is composed of a cylindrical electric field and 16 Matsuda plates.

In the case of a multi-turn TOF-MS, each toroidal electric field contains a center trajectory and is vertically symmetrical at the plane orthogonal to the inner and outer electrode planes. To realize the same situation with laminated toroidal electric fields, the Matsuda plates must be placed parallel to each other and vertically symmetrically with respect to a plane, which includes the center trajectory of ions and crosses the inner and outer electrodes perpendicularly, at cross sections at every rotational angle. For this purpose, the Matsuda plates must assume a screwed structure rather than a simple arcuate or elliptical structure.

Where the Matsuda plates are made of the screwed structure, cross sections at every rotational angle in the toroidal electric field are as shown in FIG. 41. This model is vertically symmetrical with respect to the centerline through each Matsuda plate. In the model of FIG. 41, a cylindrical electric field has a center trajectory of 80 mm. The inner electrode plane has a radius of 72.4 mm and an outer electrode plane has a radius of 88.4 mm. The rotational angle is 157.1°. The circulating trajectory plane of a MULTUM II is magnified by a factor of 1.6. The spacing between the Matsuda plate surfaces is 54 mm. It is assumed that each Matsuda plate has a thickness of 6 mm. In FIG. 41, the inner electrode is indicated by 55. The outer electrode is indicated by 56. The Matsuda plates are indicated by 60. Using Eq. (4), the incidence angle θ of this model is given by $$\theta = \tan^{-1}\left(\frac{54+6}{1308\times 1.6}\right) = 1.642^\circ \tag{5}$$

Electrical potential analysis and electric field analysis of this model within a two-dimensional axisymmetric system produce results as shown in FIG. 42. Where a voltage of −4000 kV was applied to the inner electrode and a voltage of +4000 kV was applied to the outer electrode, the Matsuda plate voltage having a c value of 0.0337 was +630 V. The field was symmetrical with respect to the center plane of the Matsuda plate including the center trajectory of ions.

However, it is difficult to fabricate such a screwed structure with high machining accuracy. Also, it is quite expensive to fabricate it. Accordingly, it is a fifth object of the invention to provide a method of achieving performance comparable to an electrode of a screwed structure, using an arcuate electrode that can be mass-produced economically with high machining accuracy.

To achieve these objects, the present invention is configured as follows.

(1) A first embodiment of the present invention provides a TOF-MS having an ion source capable of emitting ions in a pulsed manner, an analyzer for realizing a helical trajectory, and a detector for detecting ions. To realize the helical trajectory, the analyzer is made of plural laminated toroidal electric fields.

(2) A second embodiment of the invention is based on the first embodiment and further characterized in that the laminated toroidal electric fields are realized by incorporating plural electrodes into a cylindrical electric field.

(3) A third embodiment of the invention is based on the first embodiment and further characterized in that the laminated toroidal electric fields are realized by imparting a curvature to each electrode.

(4) A fourth embodiment of the invention is based on the first embodiment and further characterized in that the laminated toroidal electric fields are realized by incorporating plural multi-electrode plates into a cylindrical electric field.

(5) A fifth embodiment of the invention is based on any one of the first through fourth embodiments and further characterized in that the analyzer realizing the helical trajectory is used as an analyzer region in an oa-TOF-MS.

(6) A sixth embodiment of the invention is based on any one of the first through fifth embodiments and further characterized in that a deflector is disposed to adjust the angle of the laminated toroidal electric fields and the angle of incident ions.

(7) A seventh embodiment of the invention provides a TOF-MS having a conductive sample plate, means for illuminating a sample placed on the sample plate with laser light, means for accelerating ions by a constant voltage, an analyzer composed of plural electric sector fields, and a detector for detecting ions. The sample placed on the sample plate is illuminated with the laser light, whereby the sample is ionized. The generated ions are accelerated by the constant voltage. The ions are made to make multiple turns on the ion trajectory composed of the plural electric sector fields, and time-of-flight measurements are made. Thus, mass separation is performed.

(8) An eighth embodiment of the invention is based on the seventh embodiment and further characterized in that the ions are made to make multiple turns on the same trajectory.

(9) A ninth embodiment of the invention is based on the seventh embodiment and further characterized in that the ions are made to travel in a helical trajectory.

(10) A tenth embodiment of the invention provides a TOF-MS having an ion source for ionizing a sample, means for accelerating the ions in a pulsed manner, a helical-trajectory TOF-MS, an ion gate for selecting ions having a certain mass from ions passed through the mass analyzer, means for fragmenting the selected ions, a reflectron TOF-MS including a reflectron electric field, and a detector for detecting ions passed through the reflectron TOF mass analyzer. The helical TOF mass analyzer is made of plural electric sector fields. In the helical TOF mass analyzer, ions are made to travel in a helical trajectory.

(11) An eleventh embodiment of the invention is based on the tenth embodiment and further characterized in that there is further provided a second detector which is mounted between the helical-trajectory TOF mass analyzer and the reflectron electric field and capable of moving into and out of the ion trajectory.

(12) A twelfth embodiment of the invention is based on the tenth or eleventh embodiment and further characterized in that the ionization performed in the ion source consists of illuminating the sample on a conductive sample plate with laser light.

(13) A thirteenth embodiment of the invention is based on the twelfth embodiment and further characterized in that the ionization performed in the ion source is a MALDI.

(14) A fourteenth embodiment of the invention is based on the twelfth or thirteenth embodiment and further characterized in that the ions are accelerated by delayed extraction technique.

(15) A fifteenth embodiment of the invention provides a TOF-MS having an ion source for ionizing a sample, means for transporting the ions, means for accelerating the ions in a pulsed manner in a direction orthogonal to the direction in which the ions are transported, a helical-trajectory TOF-MS, an ion gate for selecting ions having a certain mass from ions passed through the mass analyzer, means for fragmenting the selected ions, a reflectron TOF-MS including a reflectron electric field, and detection means for detecting ions passed through the reflectron TOF mass analyzer. The helical-trajectory TOF-MS is made of plural electric sector fields. In the helical-trajectory TOF-MS, ions are made to travel in a helical trajectory.

(16) A sixteenth embodiment of the invention is based on the fifteenth embodiment and further characterized in that there is further provided a second detector which is mounted between the helical-trajectory TOF mass analyzer and the reflectron electric field and which is capable of moving into and out of the ion trajectory.

(17) A seventeenth embodiment of the invention is based on any one of the tenth through sixteenth embodiments and further characterized in that there is further provided deflection means capable of deflecting the ions, the deflection means being located between the means for accelerating the ions in a pulsed manner and the helical-trajectory TOF-MS to adjust the incidence angle of the ions entering the helical-trajectory TOF-MS.

(18) An eighteenth embodiment of the invention is based on any one of the tenth through eighteenth embodiments and further characterized in that the fragmenting means is CID performed in a collisional cell filled with gas.

(19) A nineteenth embodiment of the invention provides a method of TOF-mass spectrometry using a TOF-MS according to any one of the tenth through eighteenth embodiments. Only certain isotope peaks of precursor ions are selected by a helical-trajectory TOF-MS.

(20) A twentieth embodiment of the invention is based on the nineteenth embodiment and further characterized in that the certain isotope peaks are monoisotopic ions of precursor ions.

(21) A twenty-first embodiment of the invention provides a TOF-MS having a single ion source for producing ions, means for accelerating the ions in a pulsed manner, a TOF-MS, and at least two detectors. The TOF-MS is composed of plural electric sector fields. In this mass analyzer, the ions are made to travel in a helical trajectory. The ions produced from the ion source and accelerated are made to travel straight, and the flight times of the ions are measured by one of the detectors. The ions are made to travel in a helical trajectory by the plural electric sector fields, and the flight times of these ions are measured by the other detector(s).

(22) A twenty-second embodiment of the invention is based on the twenty-first embodiment and further characterized in that the ionization performed in the ion source consists of illuminating the sample on a conductive sample plate with laser light.

(23) A twenty-third embodiment of the invention is based on the twenty-second embodiment and further characterized in that the ionization performed in the ion source is a MALDI.

(24) A twenty-fourth embodiment of the invention is based on the twenty-second or twenty-third embodiment and further characterized in that the ions are accelerated by delayed extraction technique.

(25) In a twenty-fifth embodiment of the invention, the same sample is alternately measured by a linear TOF-MS and a helical-trajectory TOF-MS, using a TOF-MS according to any one of the twenty-first through twenty-fourth embodiments.

(26) A twenty-sixth embodiment of the invention provides a method of TOF-mass spectrometry using amass spectrometer according to any one of the twenty-first through twenty-fourth embodiments. The same sample is measured by a linear TOF mass analyzer and a helical-trajectory TOF-MS at the same time.

(27) A twenty-seventh embodiment of the invention provides a helical-trajectory TOF-MS using plural sets of laminated toroidal electric fields to cause ions to travel in a helical trajectory. The laminated toroidal electric fields are produced by combining a cylindrical electrode and plural Matsuda plates in plural layers. The laminated toroidal electric fields have the following features. 1) Each Matsuda plate is made of arcuate electrodes. 2) Each arcuate electrode is tilted about an axis of rotation that is defined by the intersection of the midway plane of rotational angle and the midway plane in the thickness direction. 3) At the end surface of the cylindrical electric field, the position of the center trajectory of ions is different from the midway position of each Matsuda plate at the plane of the radius of rotation of the center trajectory of the ions.

(28) A twenty-eighth embodiment of the invention provides a TOF-MS which satisfies the requirements of the twenty-seventh embodiment. The incidence angle of the ions is from 1.0° to 2.5°.

(29) A twenty-ninth embodiment of the invention provides a TOF-MS of the multi-turn type or helical-trajectory type according to any one of the first through twenty-eighth embodiments. An ion optical system is adopted which is capable of fully satisfying spatial and time focusing conditions whenever a revolution is made.

The present invention having the configurations as described so far yields the following advantages.

(1) According to the first embodiment of the invention, the laminated toroidal electric fields are used. The ions are made to travel in a helical trajectory. This increases the flight distance of the ions. Consequently, accurate mass analysis can be performed.

(2) According to the second embodiment of the invention, the helical trajectory is realized by the laminated toroidal electric fields by incorporating plural electrodes into the cylindrical electric field. The transmissivity can be improved. The transmissivity is the ratio of ions detected by the detector to ions emitted from the ion source. For example, if the transmissivity is 1 (100%), then all the ions emitted from the ion source can be detected by the detector.

(3) According to the third embodiment of the invention, the helical trajectory is realized by the laminated toroidal electric fields by imparting a curvature to the surface of the cylindrical electric field. Thus, the transmissivity can be improved.

(4) According to the fourth embodiment of the invention, the helical trajectory is achieved by the laminated toroidal electric fields by introducing plural multi-electrode plates into the surface of the cylindrical electric field. The transmissivity can be improved.

(5) According to the fifth embodiment of the invention, a mass spectrometer according to any one of the first through fourth embodiments can be employed as an orthogonal-acceleration TOF-MS. The sensitivity can be improved.

(6) According to the sixth embodiment of the invention, the trajectory of the ions entering the laminated toroidal electric fields according to any one of the first through fifth embodiments can be finely adjusted by disposing a deflector.

(7) According to the seventh embodiment of the invention, a small-sized MALDI TOF-MS having high mass resolution can be offered by the use of a multi-turn TOF-MS without using delayed extraction technique.

(8) According to the eighth embodiment of the invention, the flight distance of the ions can be increased by causing the ions to make multiple turns on the same trajectory.

(9) According to the ninth embodiment of the invention, the flight distance of the ions can be increased by causing the ions to travel in a helical trajectory. Furthermore, overtaking of the ions is prevented.

(10) According to the tenth embodiment of the invention, the selectivity of precursor ions in TOF/TOF equipment can be enhanced. Consequently, mass analysis of product ions can be performed more easily and accurately.

(11) According to the eleventh embodiment of the invention, the selectivity can be improved.

(12) According to the twelfth embodiment of the invention, ions are ionized by illuminating the sample on the sample plate with laser light, and these ions can be analyzed with TOF/TOF equipment.

(13) According to the thirteenth embodiment of the invention, ions produced by MALDI can be analyzed with TOF/TOF equipment.

(14) According to the fourteenth embodiment of the invention, the time focusing at an intermediate focal point can be improved.

(15) According to the fifteenth embodiment of the invention, precursor ions generated by a continuous ion source can be analyzed with TOF/TOF equipment. The selectivity can be improved by making use of a helical-trajectory TOF-MS. Mass analysis of product ions can be performed more easily and accurately.

(16) According to the sixteenth embodiment of the invention, the selectivity can be improved.

(17) According to the seventeenth embodiment of the invention, the incidence angle of the ions entering the helical-trajectory TOF-MS can be adjusted better.

(18) According to the eighteenth embodiment of the invention, fragmentation of ions can be performed efficiently.

(19) According to the nineteenth embodiment of the invention, only certain isotope peaks of precursor ions can be selected.

(20) According to the twentieth embodiment of the invention, the certain isotope peaks are monoisotopic ions of precursor ions. Consequently, mass analysis can be performed accurately.

(21) According to the twenty-first embodiment of the invention, a linear TOF-MS unit and a helical-trajectory TOF-MS unit are combined. Thus, measurements can be performed while making use of the features of both units.

(22) According to the twenty-second embodiment of the invention, the sample on the sample plate is illuminated with laser light to ionize the ions. These ions can be mass analyzed.

(23) According to the twenty-third embodiment of the invention, ions produced by MALDI can be mass analyzed.

(24) According to the twenty-fourth embodiment of the invention, ions can be accelerated using delayed extraction technique.

(25) According to the twenty-fifth embodiment of the invention, more information can be obtained by measuring a sample by the linear TOF-MS and helical-trajectory TOF-MS alternately.

(26) According to the twenty-sixth embodiment of the invention, more information can be obtained by analyzing ions and neutral particles produced from the same sample by the linear TOF-MS and helical-trajectory TOF-MS.

(27) According to the twenty-seventh embodiment of the invention, a helical-trajectory TOF-MS can be realized using laminated toroidal electric fields which use arcuate electrodes that can be mass produced economically with high machining accuracy.

(28) According to the twenty-eighth embodiment of the invention, the angle of the arcuate Matsuda plates can be optimized in the helical-trajectory TOF-MS in which the incidence angle of ions is set to 1.0° to 2.5°.

(29) According to the twenty-ninth embodiment of the present invention, the multi-turn TOF-MS or helical-trajectory TOF-MS according to any one of the first through twenty-eighth embodiments adopts the ion optical system that can fully satisfy the spatial and time focusing conditions whenever a revolution is made, regardless of initial position, initial angle, or initial energy. The flight time can be prolonged while maintaining the time focusing properties.

BRIEF DESCRIPTION OF THE DRAWINGS

FIG. 33 is a conceptual diagram of MS/MS equipment in which TOF-MS units are connected in tandem;

FIG. 34 is a diagram illustrating isotope peaks;

FIG. 35 is a diagram illustrating isotope peaks of product ions;

FIG. 36 is a diagram illustrating isotope peaks of neutral particles;

FIG. 37 is a diagram illustrating isotope peaks of precursor ions;

DETAILED DESCRIPTION OF THE PREFERRED EMBODIMENTS

Embodiments of the present invention are hereinafter described in detail with reference to the drawings.

Figure 1:
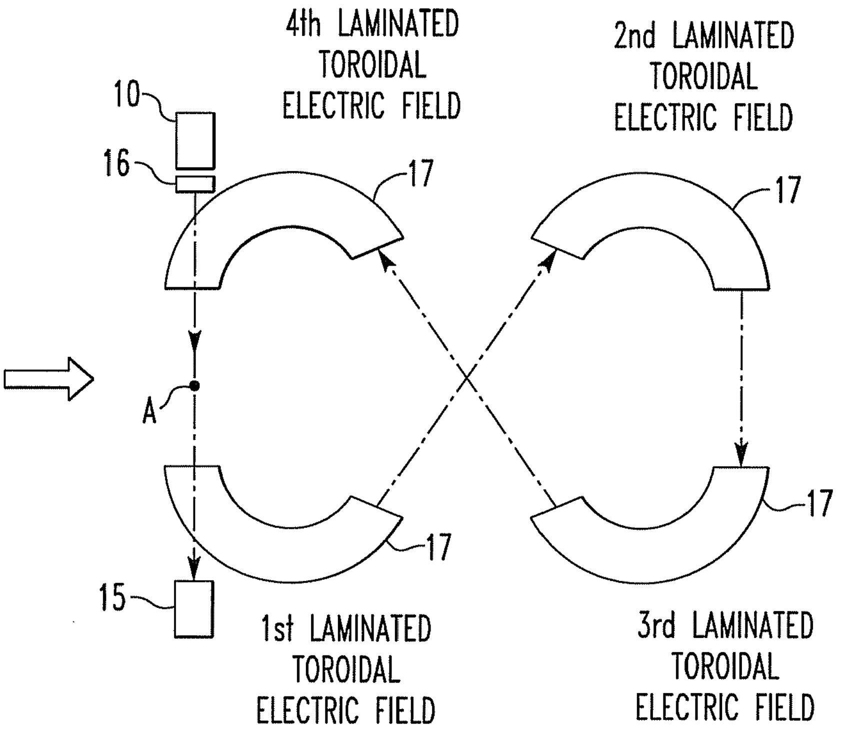
FIG. 1 is a conceptual view illustrating the configuration of the present invention.
Figure 28:
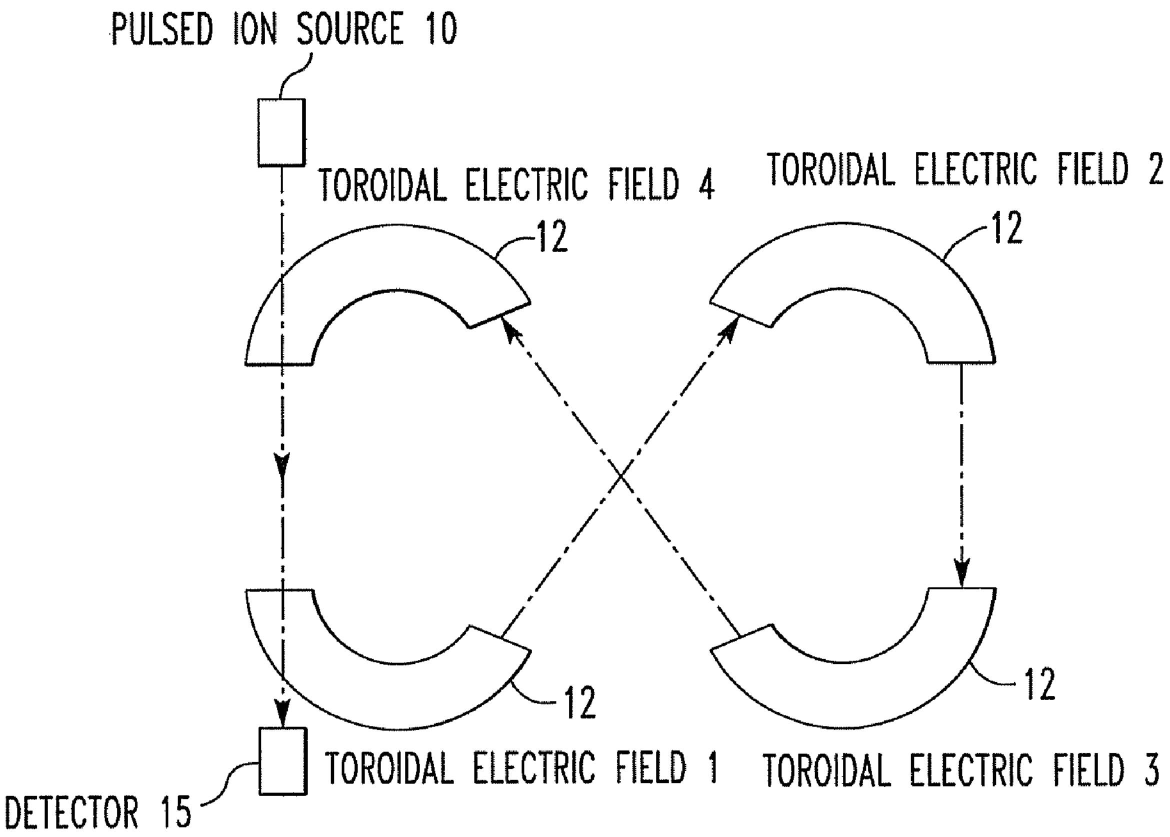
FIG.28 PRIOR ART
FIG. 28 is a diagram illustrating the principle of operation of a multi-turn TOF-MS.

FIG. 1 is a conceptual view illustrating the configuration of a first aspect of the present invention, taken from above an electrode structure. In this respect, this view is similar to FIG. 28. However, electrodes are formed in multiple layers in the direction vertical to the plane of the paper (see FIG. 2), unlike in FIG. 28. Like components are indicated by like reference numerals in both FIGS. 1 and 28. The apparatus shown in FIG. 1 has a pulsed ion source 10, a deflector 16 for adjusting an ion trajectory emerging from the ion source 10, and electrodes 17 disposed symmetrically as shown. The electrodes 17 produce laminated toroidal electric fields 1-4, respectively.

Figure 2:
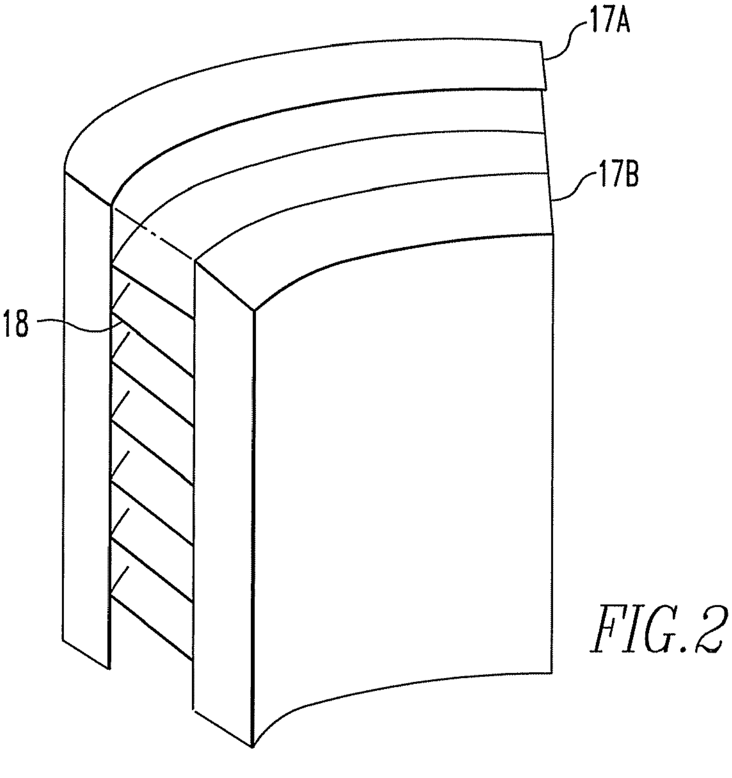
FIG. 2 is a diagram showing an example of configuration of electrodes according to the present invention.

FIG. 2 shows an example of the electrode structure according to the present invention. First electrodes 17A and 17B act as a pair. Second electrodes 18 are mounted in a space formed by the electrodes 17A and 17B. The second electrodes 18 are mounted at an angle to the direction perpendicular to the longitudinal direction of the electrodes 17A and 17B. A detector 15 detects ions which made the final turn on the trajectory. A point A shown in FIG. 1 forms the initial point and the final point of a circuit trajectory.

Figure 3:
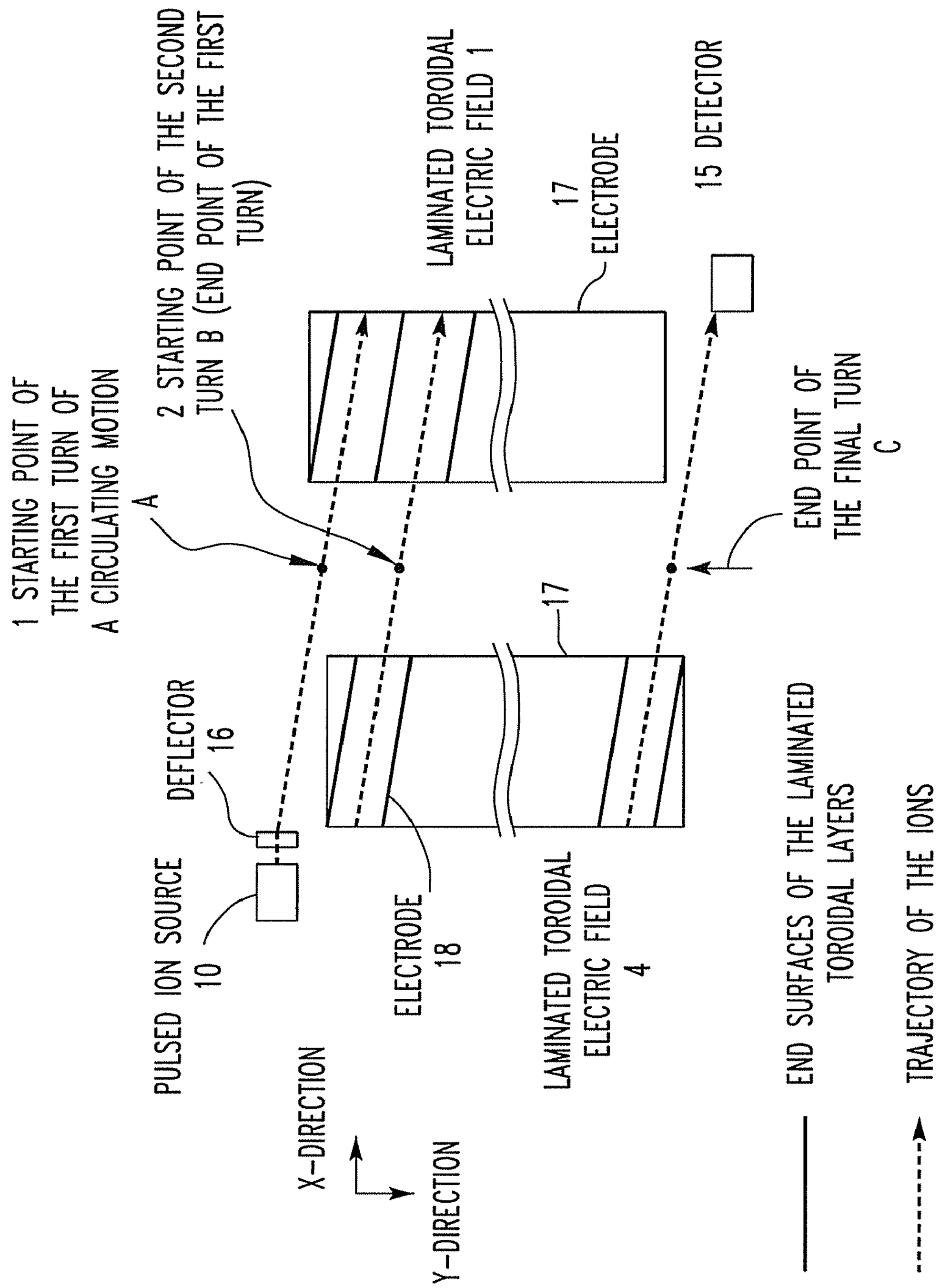
FIG. 3 is a view of the apparatus shown in FIG. 1 as viewed from the direction of the arrow.

FIG. 3 is a view of the apparatus shown in FIG. 1, as viewed from the direction of the arrow. Like components are indicated by like reference numerals in FIGS. 1, 2, and 3. The first electrodes are indicated by 17. The second electrodes 18 are mounted inside the first electrodes 17 at a certain angle. The bold lines indicate the end surfaces of the laminated toroidal layers. The arrows indicated by the dotted lines indicate the trajectory of the ions. The starting point of the first turn of a circulating motion is indicated by A. The starting point of the second turn (i.e., the end point of the first turn) is indicated by B. The end point of the final turn is indicated by C.

In the apparatus constructed in this way, ions are generated by the pulsed ion source 10 and accelerated by a pulsed voltage generator. The trajectory of the accelerated ions is adjusted by the deflector 16. At this time, the tilt angle of the ions is matched to the tilt angle of the electrodes 18. Immediately before the ions enter the laminated toroidal electric field 1, the ions are accelerated by the pulsed accelerating voltage at instant t0. The ions pulled into the laminated toroidal electric field 1 are accelerated by the accelerating voltage, make a circulating motion in an 8-shaped trajectory through the laminated toroidal electric fields 1-4 as shown, and move downward helically. Then, the ions arrive at the detector 15 at instant t1 from the final laminated toroidal electric field 1. The flight time of the ions is given by t1-t0. The elapsed time is measured, and mass analysis is performed.

Figure 5:
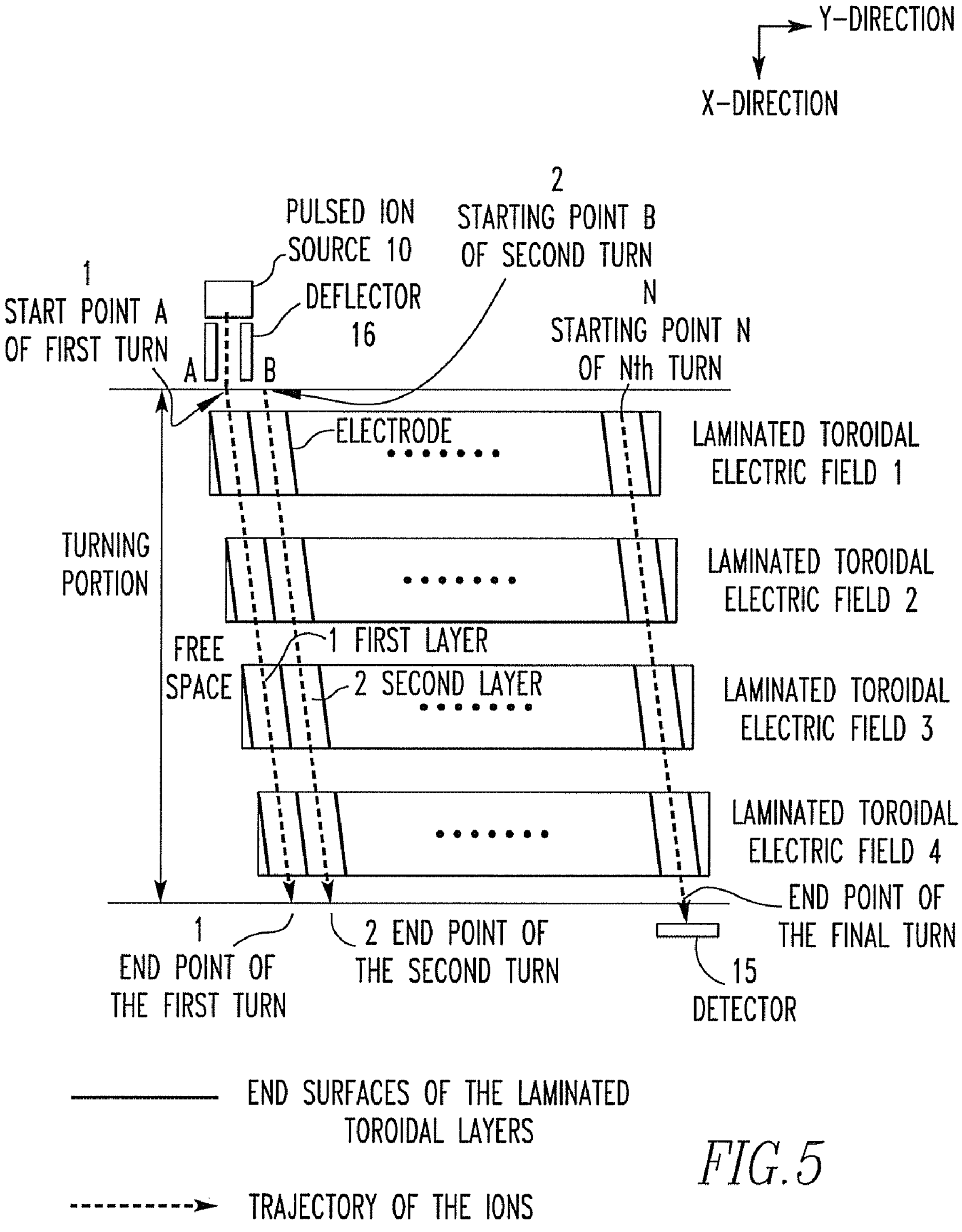
FIG. 5 is an expanded view of an ion trajectory.

FIG. 5 is an exploded view of the ion trajectory. Like components are indicated by like reference numerals in FIGS. 1 and 5. As shown in FIG. 5, the laminated toroidal electric fields 1-4 are arranged as shown. The ions emitted from the pulsed ion source 10 are adjusted in trajectory by the following deflector 16 such that the tilt becomes equal to the tilt of the laminated toroidal electric fields. The ions whose trajectory has been modified in this way are made to enter the laminated toroidal electric fields. The point A is the starting point of the first turn of the circulating motion.

The ions passed through the laminated toroidal electric field 1 travel through a free space and enter the laminated toroidal electric field 2. The ions are then enter the laminated toroidal electric field 3. The ions are then enter the laminated toroidal electric field 4. The ions are then reenter the laminated toroidal electric field 1 from the starting point B of the toroidal electric field 1 of the second layer. The ions travel through this electric field. The ions which have circulated on the helical trajectory in this way enter the laminated toroidal electric field 1 from the starting point N of the Nth turn. The ions passed through the laminated toroidal electric field 4 are detected by the detector 15.

As described so far, according to the first aspect of the present invention, ions are made to move downward while describing a helical trajectory in the orthogonal direction. This increases the flight time of the ions. Consequently, accurate mass analysis can be performed.

Figures 4A, 4B:
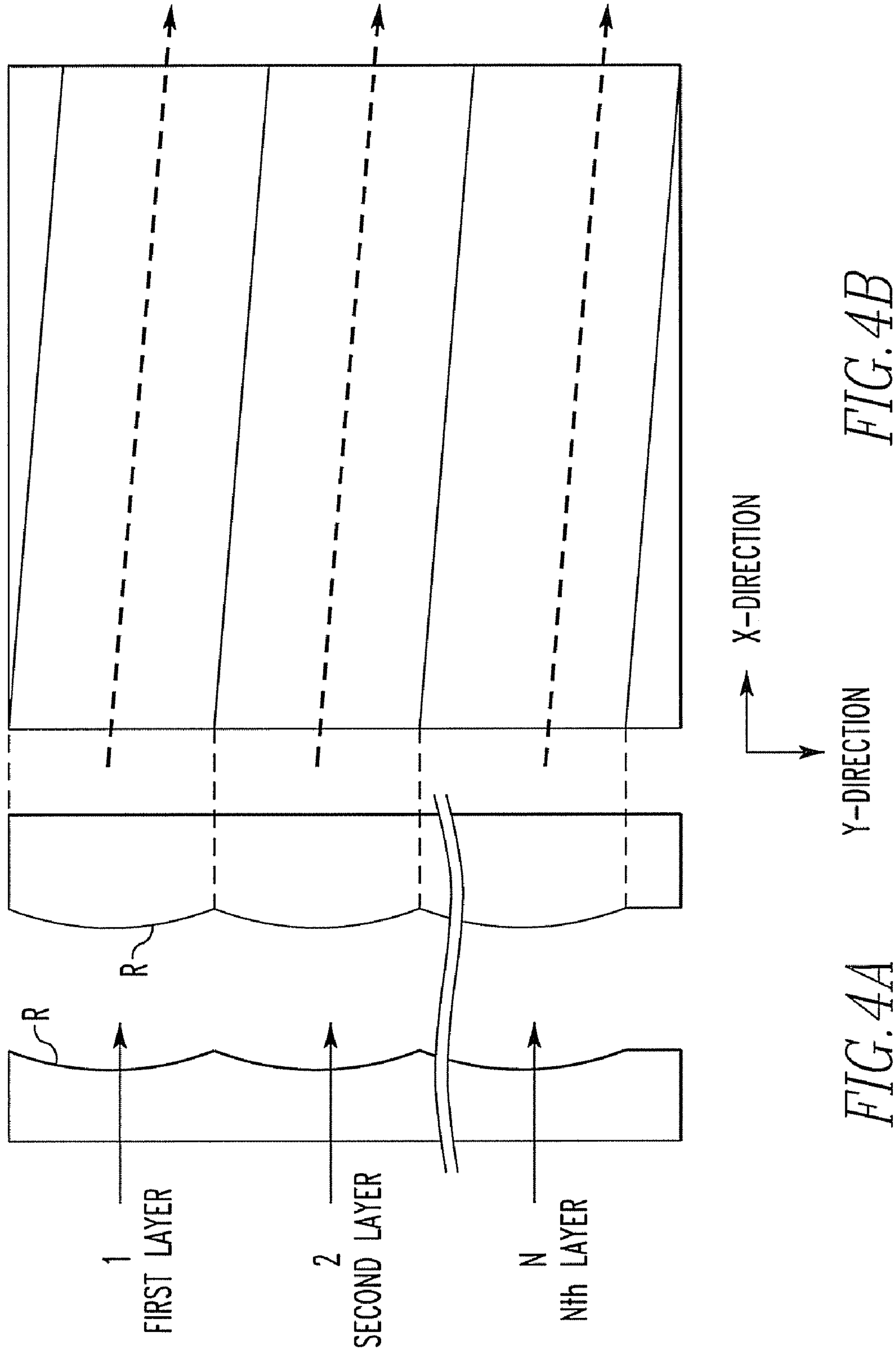
FIG. 4A is a view of a laminated toroid according to an embodiment of the present invention, as viewed from the end surface of electric field.
FIG. 4B is a view of the laminated toroid as viewed from a side.

In a first embodiment, curvatures matched to the toroidal electric field geometry to be realized on the inner surface of the cylindrical electric field are imparted in layers. FIG. 4A shows a laminated toroid according to the present invention, as viewed from the end surface of the electric field, illustrating the first embodiment. FIG. 4A is a view of the laminated toroid as viewed from the end surface of the electric field. FIG. 4B is a view of the laminated toroid as viewed from a side. In FIG. 4B, the broken lines indicate the trajectory of ions. The arrangement of the laminated toroidal electric fields in the X-direction is the same as shown in FIG. 1.

As shown in FIG. 4A, curvature R is imparted to the electrode surface as shown for each of the first through Nth layers. By imparting the curvature R to each electrode surface in this way, the produced electric field has a curvature matched to the curvature R. As a result, the focusing properties of the ions passed through the electric field can be improved.

The wavy layers having the curvature R are tilted relative to the Y-direction. The spatial arrangement of the laminated toroidal electric fields 1 and 2 is so set that the fields are shifted in the Y-direction such that ions emerging from the electric field 1 pass through the free space (from the field 1 to the field 2) and can enter the same layer of the field 2. The laminated toroidal electric fields 3 and 4 are shifted similarly. The ions emerging from the toroidal electric field 4 enter the next layer of the field 1. The arrangement of the laminated toroidal electric fields 1-4 is the same as the arrangement shown in FIG. 1.

Ions are created by the pulsed ion source 10 and accelerated by a pulsed voltage. The accelerated ions are adjusted such that their tilt becomes identical with the tilt of the laminated toroidal electric fields by the deflector 16. The adjustment is made such that the ions enter the top layer of the electric field 1. After the end of the final turn of the circulating motion, the ions are detected by the detector 15.

According to this embodiment, a curvature can be imparted to the surface of the cylindrical electric field and so the focusing properties of the circulating ions in the orthogonal direction can be improved.

Figures 6A, 6B:
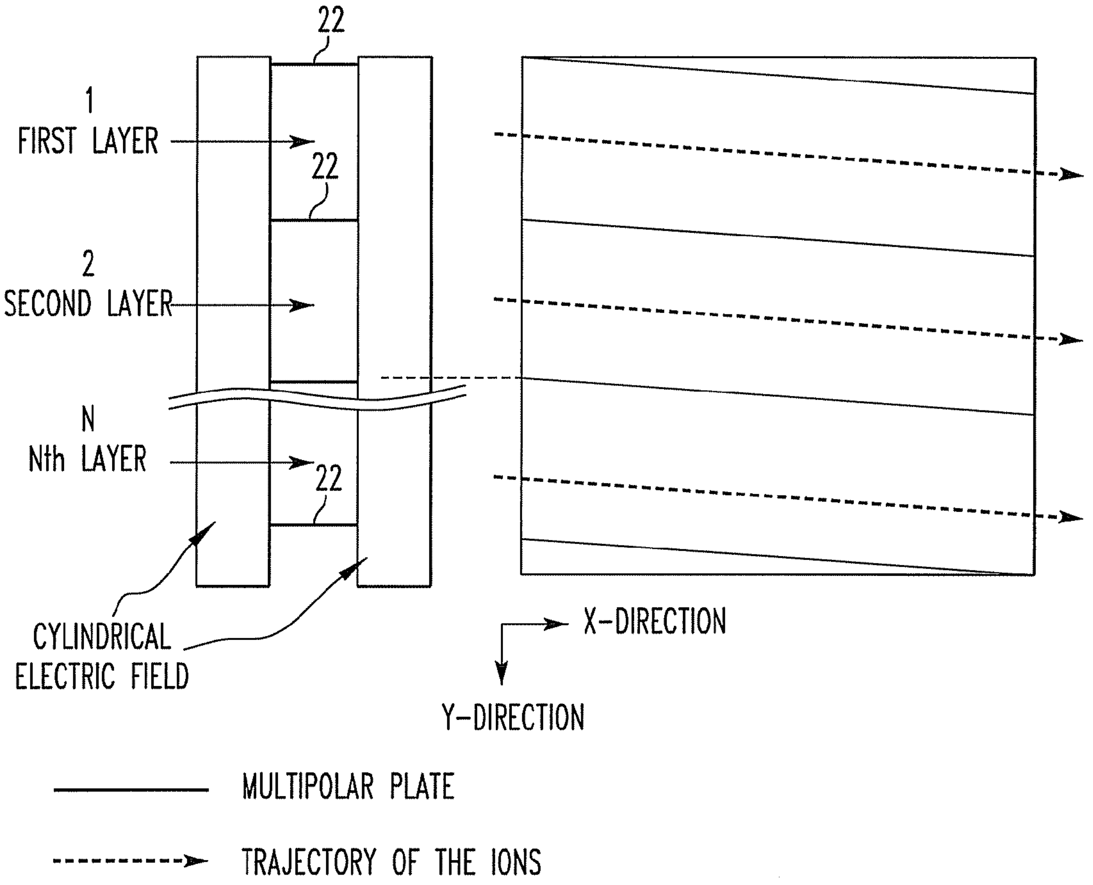
FIG. 6A is a view of a toroidal electric field as viewed from the end surface of electric field.
FIG. 6B is a view of the toroidal electric field as viewed from a side.
Figure 7:
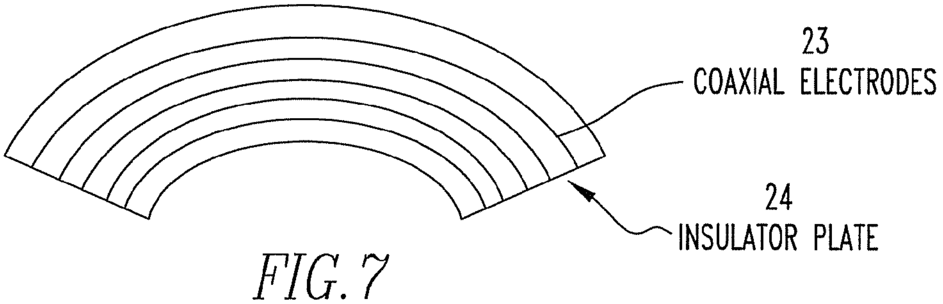
FIG. 7 is a view showing an example of structure of a multi-electrode plate used in an embodiment of the present invention.

FIGS. 6A and 6B illustrate the laminated toroidal electric fields, depicting a second embodiment. The arrangement of the laminated toroidal electric fields 1-4 is the same as the arrangement shown in FIG. 1. FIG. 6A is a view of the laminated toroidal electric fields as viewed from the end surface of the electric field. FIG. 6B is a view of the laminated toroidal electric fields as viewed from a side. Electrodes 22 are mounted in the cylindrical electric field. In FIG. 6B, the bold lines indicate the electrodes. The broken lines indicate the trajectory of the ions. Instead of the electrodes, multipolar plates may be used. FIG. 7 shows an example of configuration of the multipolar plate used in the present embodiment. The multipolar plate has coaxial electrodes 23 and an insulator plate 24 mounted at the ends of the coaxial electrodes.

In this embodiment, the laminated toroidal electric fields 1-4 are realized by laminated multipolar electric fields, which in turn are accomplished by incorporating plural coaxial electrodes (multipolar plates) onto the insulator plate 24 within the cylindrical electric field. In this embodiment, a voltage is applied to the multipolar electric field to permit production of a necessary toroidal electric field geometry. The multipolar plates 22 are tilted relative to the Y-direction.

In the apparatus constructed in this way, ions are created by the pulsed ion source 10 and accelerated by a pulsed voltage. Then, an adjustment is made by the deflector 16 such that the tilt of the trajectory of the ions becomes identical with the tilt of the laminated toroidal electric fields. The ions are deflected such that they enter the top portion of the laminated toroidal electric field 1. The ions travel through the layers in an 8-shaped trajectory. The ions exiting from the final layer are detected by the detector 15.

According to this embodiment of the invention, a curvature can be imparted to the surface of the cylindrical electric field and, therefore, the focusing properties of the circulating ions in the orthogonal direction can be improved.

Figure 8:
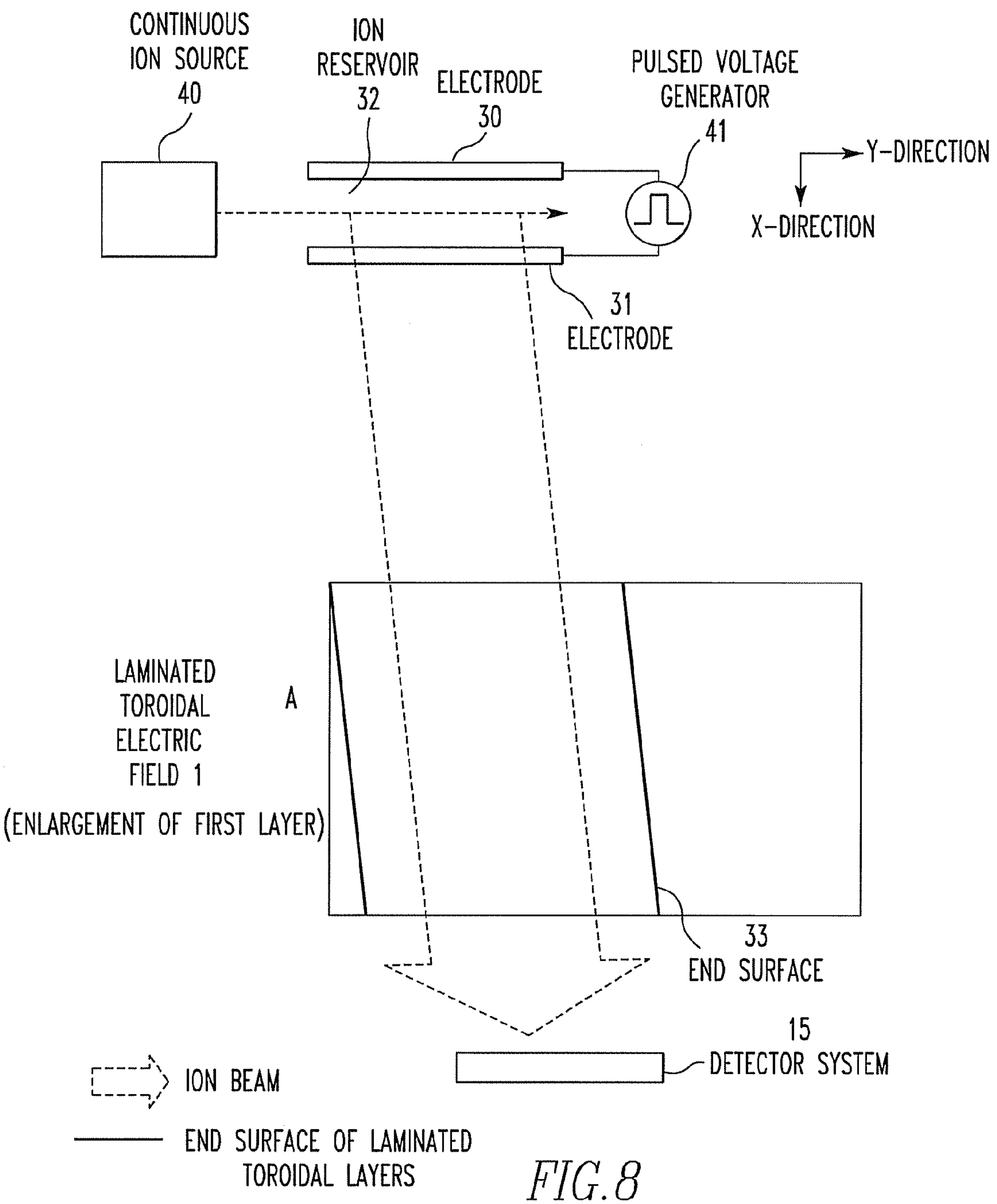
FIG. 8 is a view illustrating the operation of a fourth embodiment of the invention.

FIG. 8 is a diagram illustrating the operation of a third embodiment of the first aspect of the present invention. In the figure, a continuous ion source 40 emits ions continuously. In this embodiment, the continuous ion source 40 is combined with the present aspect of the invention. A pulsed voltage generator 41 applies an accelerating voltage to electrodes 30 and 31. Indicated by 32 is an ion reservoir. Indicated by A is a laminated toroidal electric field 1. Only its first layer is shown in enlarged form. The end surface of the laminated toroidal layers is indicated by 33. The trajectory of the ion beam is indicated by the arrow of the broken lines. The laminated toroidal electric fields adopt any one of the configurations of the above-described first through third embodiments.

In the apparatus constructed in this way, ions are created by the continuous ion source 40 and transported into the ion reservoir 32. The ions stored in the reservoir 32 are applied with a pulsed voltage applied to the electrodes 30 and 31. At this time, the ions are inevitably ejected obliquely by the transport kinetic energy from the continuous ion source 40 and by the accelerating energy created by the pulsed voltage. This tilt is brought into coincidence with the tilt of the laminated toroidal electric fields. The ions are finally detected by the detector 15 after circulating through the laminated toroidal electric fields. In this embodiment, the ions are subsequently made to travel in a helical trajectory in the same way as in the first embodiment, and the ions are detected.

According to this embodiment, improved sensitivity can be accomplished by realizing an orthogonal-accelerating helical-trajectory TOF-MS made of the laminated toroidal electric fields.

Fourth Embodiment

Figure 9:
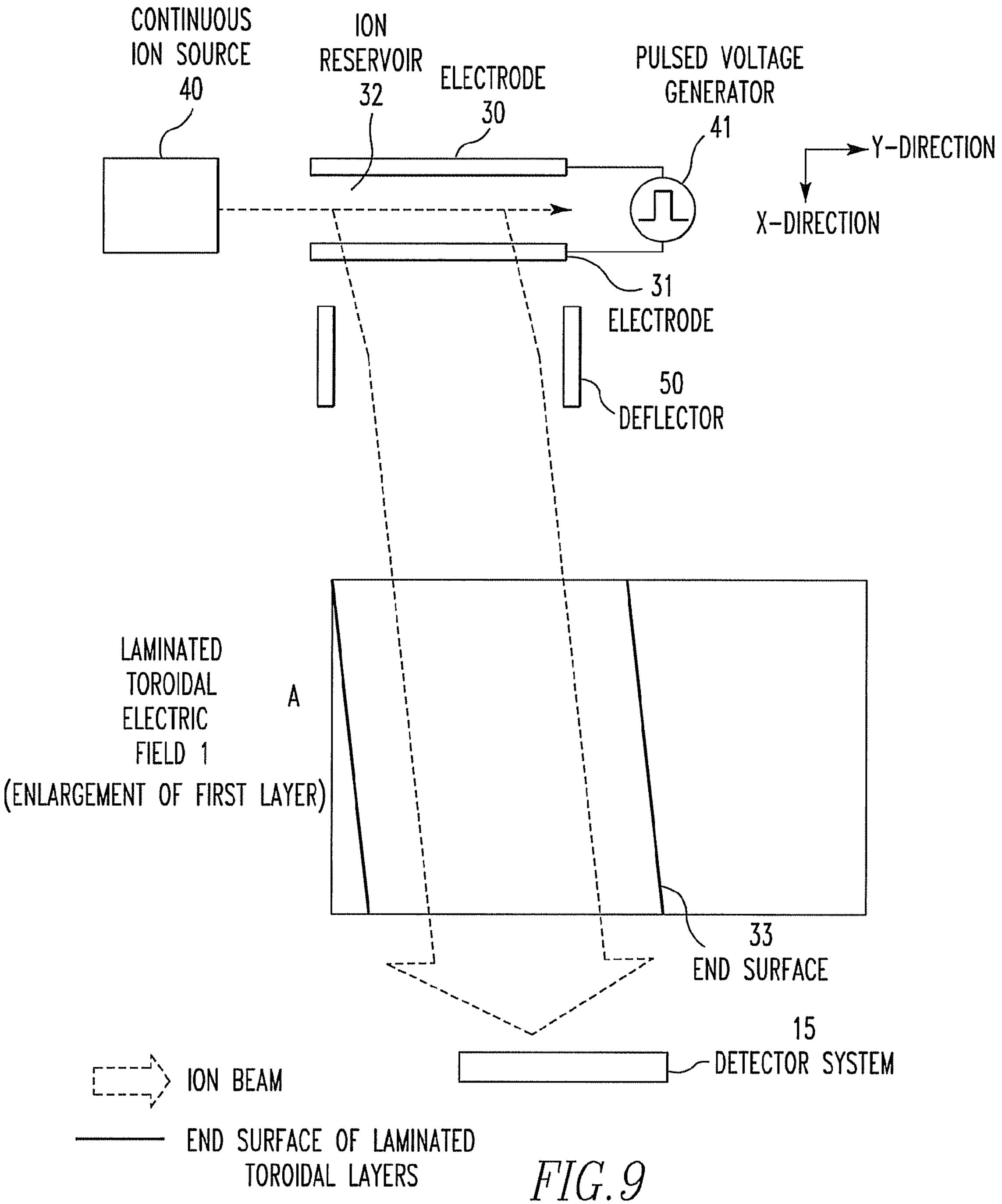
FIG. 9 is a view illustrating the operation of a fifth embodiment of the invention.

FIG. 9 is a diagram illustrating the operation of the fourth embodiment of the present invention. Like components are indicated by like reference numerals in both FIGS. 8 and 9. This embodiment has the configuration shown in FIG. 8. In addition, ions entered from the ion reservoir 32 are further deflected to permit angular adjustment. In the figure, a deflector 50 is mounted to adjust the angle of the entered ions. The deflector operates to match the tilt angle of the ions to the tilt angle of the laminated toroidal electrodes in a case where the tilt angle of the laminated toroidal electrodes is different from the tilt of the ejected ions.

In the apparatus constructed in this way, ions are created by the continuous ion source 40 and transported into the ion reservoir 32 perpendicularly to the direction of acceleration. The ions stored in the reservoir 32 are applied with a pulsed voltage from the electrodes 30 and 31. At this time, the ions are inevitably traveled obliquely to the trajectory plane as shown by the velocity gained by the pulsed voltage and by the transport velocity from the continuous ion source 40. The tilt is further adjusted by the deflector 50 used for angular adjustment. As a result, the ions are made to enter at an angle matched to the tilt of the laminated toroidal electric field 1. The ions which have circulated through the laminated toroidal electric fields are finally detected by the detector 15. Subsequently, the ions are made to travel in a helical trajectory in the same way as in the first embodiment and are detected.

According to this embodiment, the ion beam entering the laminated toroidal electric fields can be adjusted by the deflector.

Figure 10:
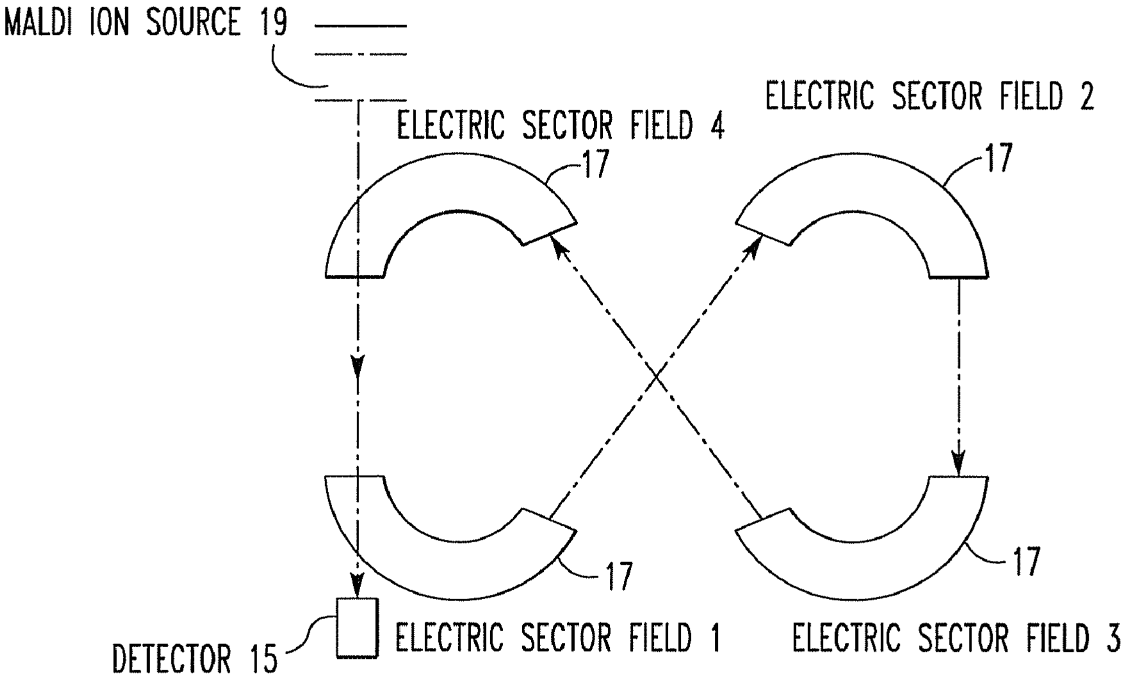
FIG. 10 is a conceptual view illustrating the configuration of a second aspect of the present invention.
Figure 11:
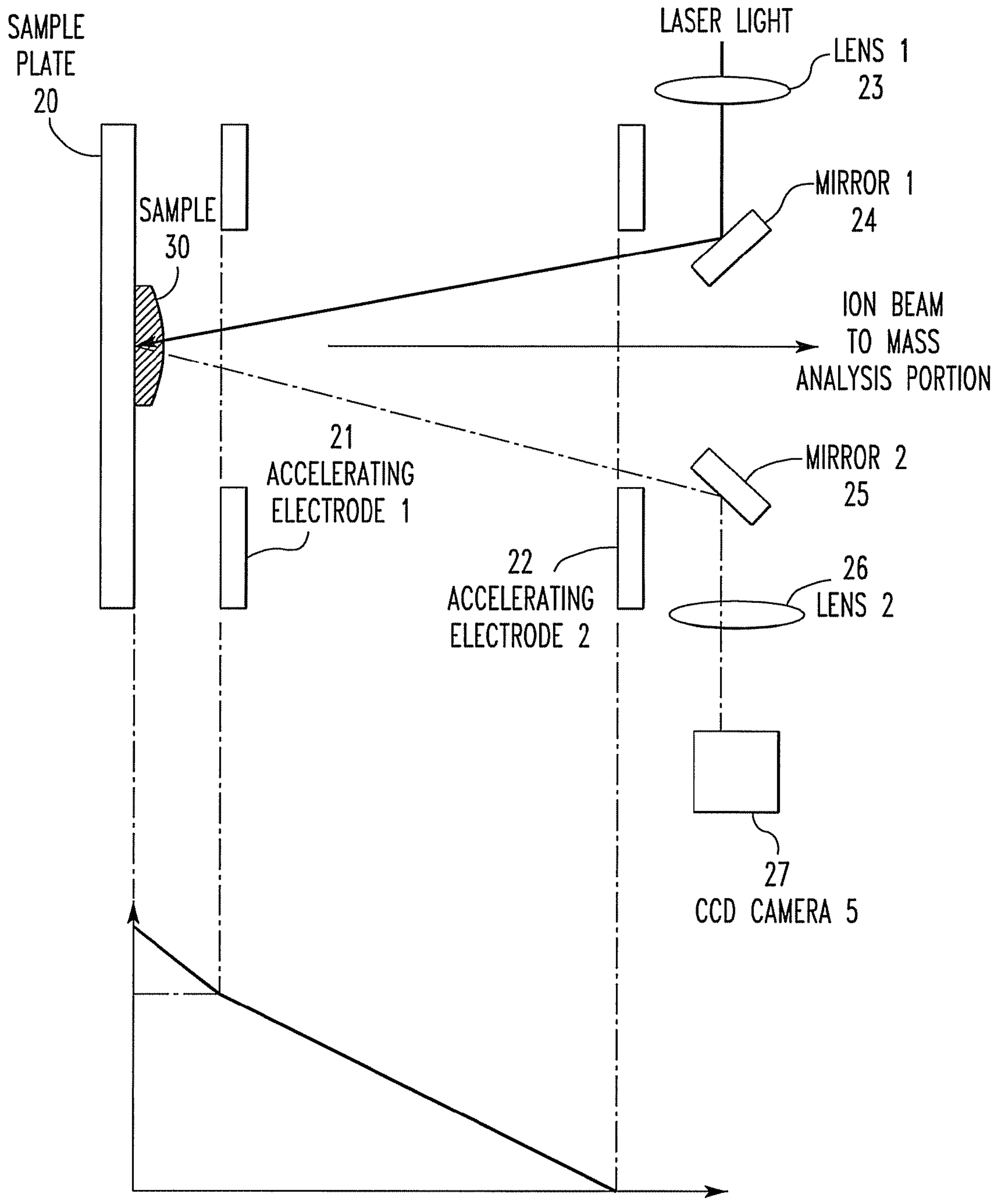
FIG. 11 is a conceptual view of a multi-turn mass spectrometer equipped with the prior-art ion source.
Figure 29A:
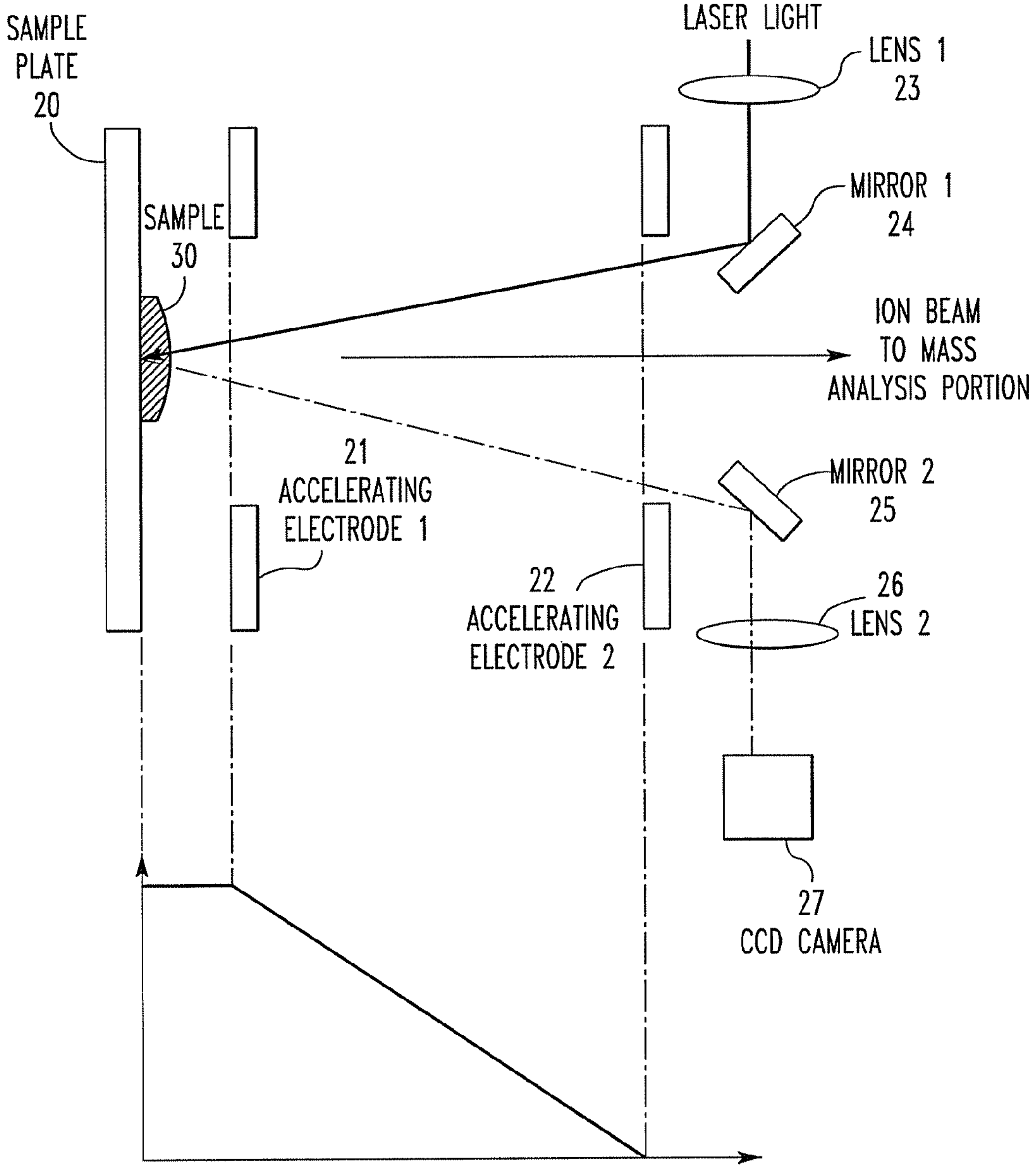
FIG.29A PRIOR ART
FIGS. 29A and 29B are diagrams schematically illustrating MALDI ion source, ion accelerating portion, and delayed extraction technique.
Figure 29B:
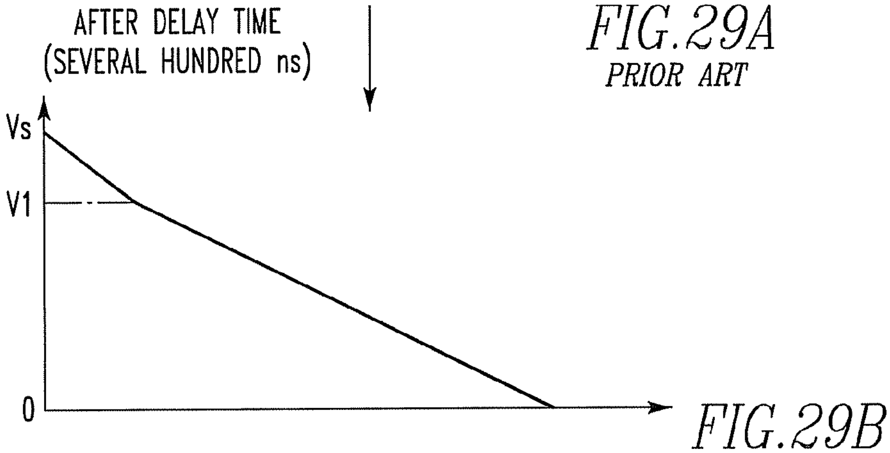
FIG.29B PRIOR ART
Figure 30:
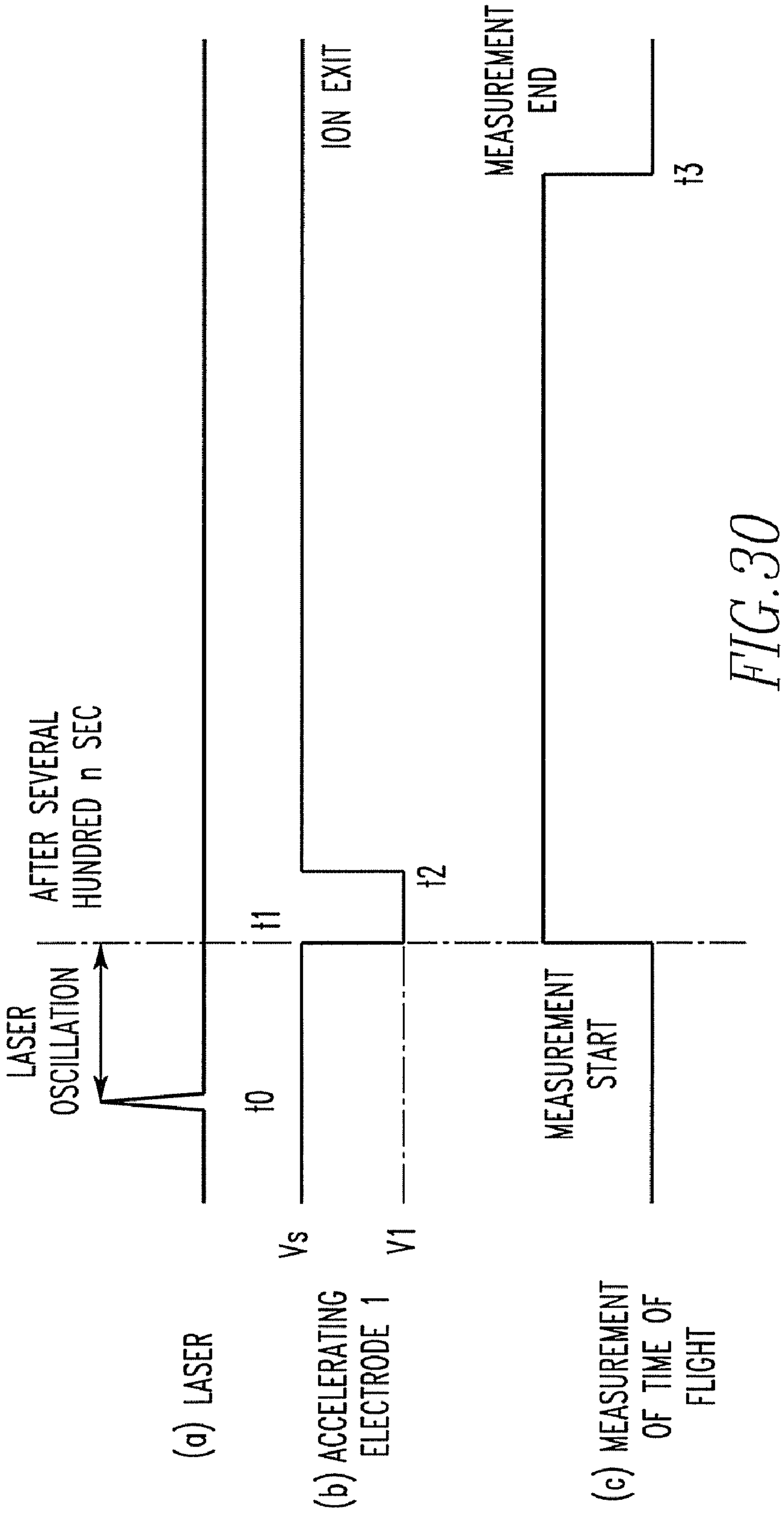
FIG. 30 PRIOR ART
FIG. 30 is a diagram illustrating a time sequence using the prior-art delayed extraction technique.
Figure 31:
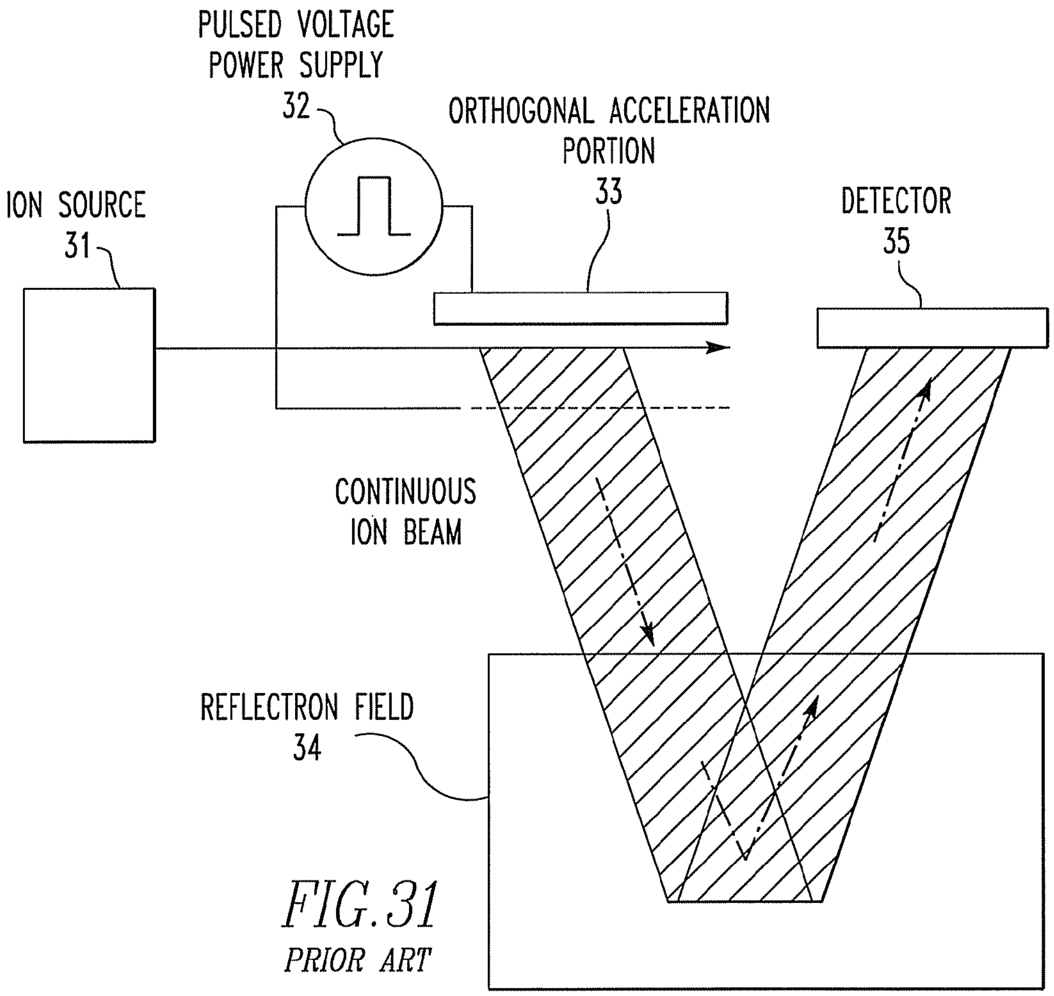
FIG. 31 PRIOR ART
FIG. 31 is a conceptual diagram illustrating orthogonal-acceleration TOF-MS.
Figure 32:
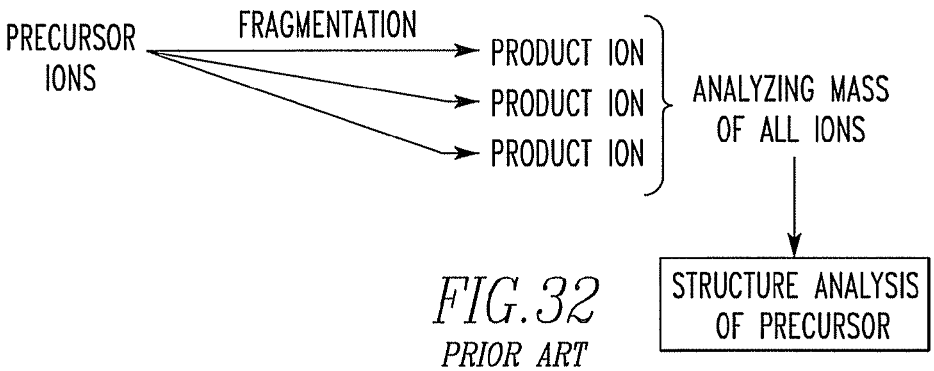
FIG. 32 PRIOR ART
FIG. 32 is a diagram illustrating an MS/MS measurement.
Figure 38:
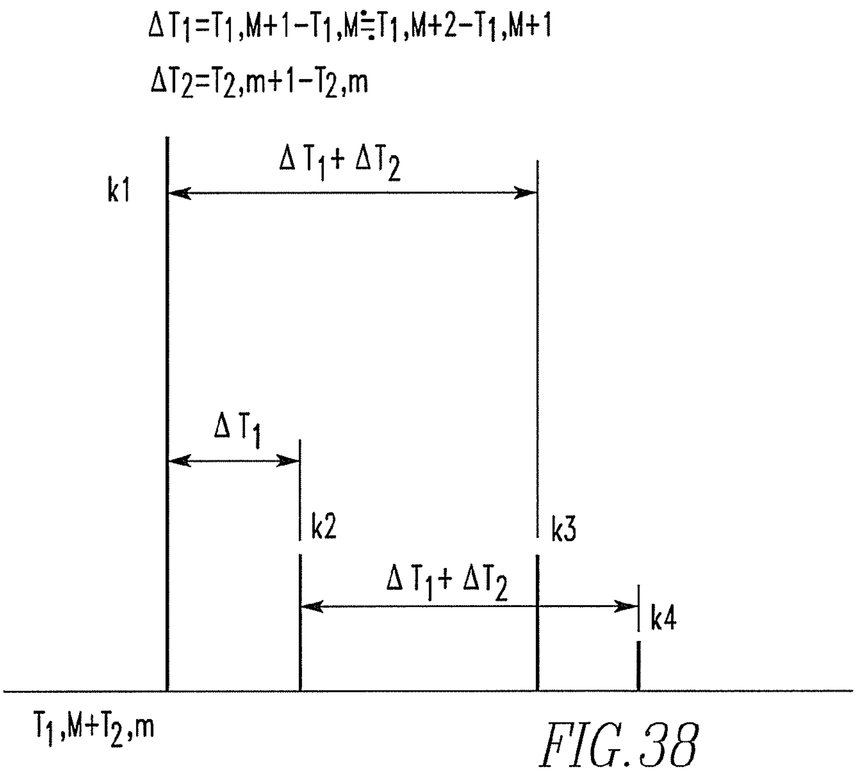
FIG. 38 is a diagram illustrating harmful effects produced by selecting plural isotope peaks in TOF/TOF equipment.

FIG. 10 is a conceptual diagram illustrating the configuration of a second aspect of the present invention. FIG. 11 shows an ion source and an ion accelerating portion. Like components are indicated by like reference numerals in both FIGS. 1 and 10. Also, like components are indicated by like reference numerals in both FIGS. 11 and 29. A sample 30 is mixed into a matrix (such as liquid or crystalline compound or metal powder), dissolved, solidified, and placed onto a sample plate 20. A lens 2, a mirror 25, and a CCD camera 27 are disposed to permit observation of the state of the sample 30.

Laser light is directed at the sample 30 via the lens 1 and mirror 24 to vaporize or ionize the sample. Ions produced from the MALDI ion source 19 are accelerated by a constant voltage applied to the accelerating electrodes 1 and 2 and introduced into a multi-turn TOF-MS shown in FIG. 10. In a general TOF-MS, it is necessary that the produced ions be pulsed by a pulsed voltage for measurement of flight times. In the second aspect, this is not necessary, because the laser irradiation itself is performed in a pulsed manner. To trigger the start of the measurement of a flight time, a signal from the laser is used.

Figure 12:
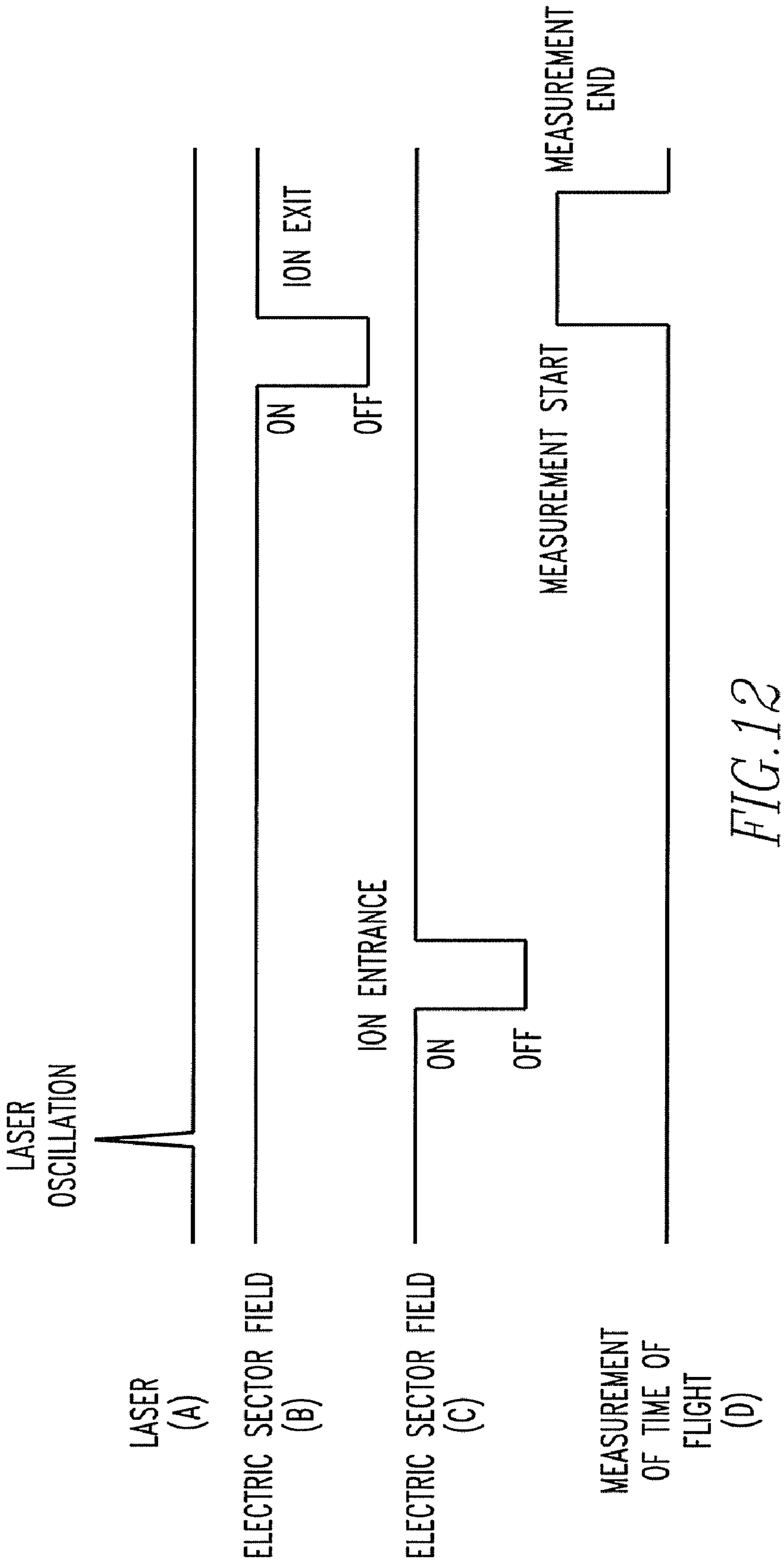
FIG. 12 is a diagram illustrating an operational sequence of a first embodiment of the invention.

The multi-turn TOF-MS is composed of electric sector fields 1-4. Ions are entered by turning off the electric sector field 4. The ions are made to exit by turning off the electric sector field 1. A sequence of operations for measurement of one flight time is illustrated in FIG. 12. FIG. 12 is a diagram illustrating the operational sequence of the first embodiment. (a) shows the state of the laser. (b) shows the state of the electric sector field 1. (c) shows the state of the electric sector field 4. (d) illustrates measurement of a flight time.

The voltages applied to the electric sector fields 1 and 4 are switched based on the signal from the laser. The voltage on the electric sector field 4 is turned off during incidence of ions. During circulating motion of the ions, the voltage is turned on. The voltage on the electric sector field 1 is on during the circulating motion. When this voltage is turned off, the ions travel toward the detector 15. The number of turns that is associated with the mass resolution can be modified by adjusting the time for which the electric sector field 1 is kept on.

In this way, according to the first embodiment, a small-sized, high-mass-resolution MALDI TOF-MS can be offered using a multi-turn TOF-MS without using delayed extraction technique. Furthermore, the flight distance of the ions can be increased by making the ions to repeatedly travel on the same trajectory many times.

Second Embodiment

Figure 13A:
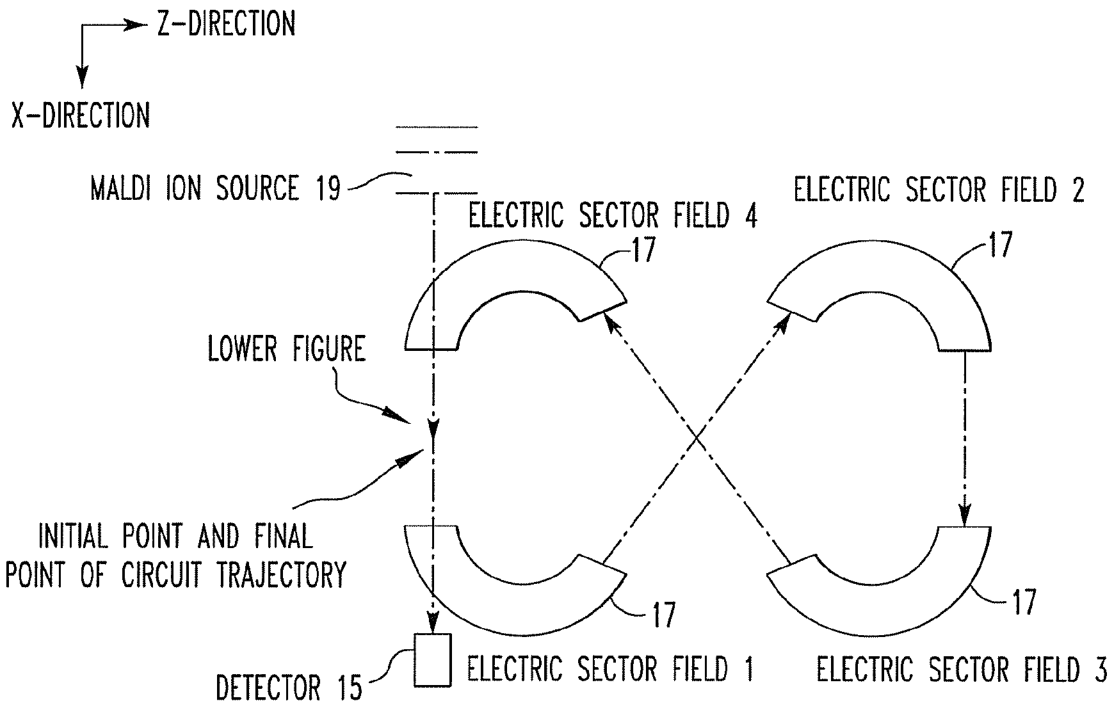
FIG. 13A shows views of the mass spectrometer according to the second aspect as viewed from the Y-direction and FIG. 13B as viewed from the Z-direction.
Figure 13B:
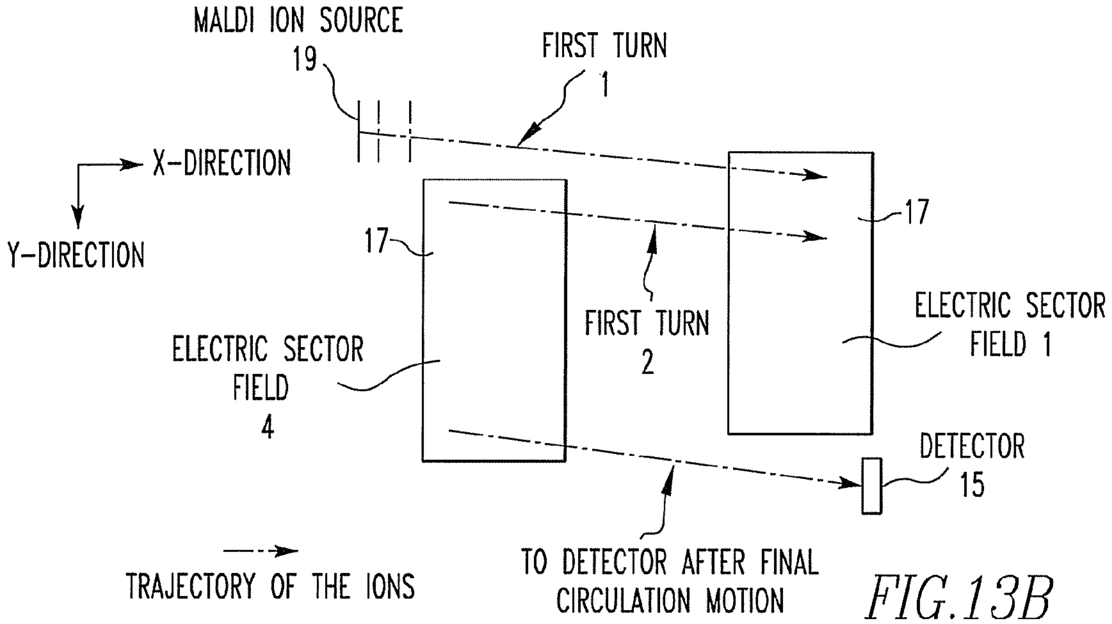

FIGS. 13A and 13B are diagrams illustrating a first embodiment of the second aspect of the present invention. Like components are indicated by like reference numerals in both FIGS. 10 and 13A and 13B. FIG. 13A is a view of the apparatus as viewed from the Y-direction. FIG. 13B is a view of the apparatus as viewed from the direction of the arrow of the "lower view" in FIG. 13A. A sample 30 is mixed into a matrix (such as liquid or crystalline compound or metal powder), dissolved, solidified, and placed onto a sample plate 20 (see FIG. 11). A lens 2, a mirror 25, and a CCD camera 27 are disposed to permit observation of the state of the sample 30.

Laser light is directed at the sample 30 via the lens 1 and mirror 24 to vaporize or ionize the sample. The generated ions are accelerated by the voltage applied to the accelerating electrodes 21 and 22 and introduced into a helical-trajectory TOF-MS. In a general TOF-MS, it is necessary that the produced ions be pulsed by a pulsed voltage for measurement of flight times. In this aspect of the invention, this is not necessary, because the laser irradiation itself is performed in a pulsed manner. To trigger the start of the measurement of a flight time, a signal from the laser is used.

The helical-trajectory TOF-MS is composed of electric sector fields 1-4. To cause the ions to enter at an angle to each electric sector field, the trajectory is shifted in the direction (Y-direction) orthogonal to the circulating trajectory plane (XZ-plane) after passing through the sector fields 1-4 in turn. The number of turns is determined by the angle at which the ions enter the helical-trajectory TOF-MS from the ion source and by the length of each electric sector field taken in the Y-direction. After the final turn on the trajectory, the ions arrive at the detector 15.

According to this embodiment, the ions are made to travel in a helical trajectory, thus increasing the flight distance of the ions. Furthermore, overtaking of the ions is prevented.

According to the embodiments of the second aspect described so far, MS measurements can be performed with high mass resolution and mass accuracy over a wide range of masses in a method of mass spectrometry using a laser desorption ionization method typified by MALDI, without using delayed extraction technique.

Figure 14A:
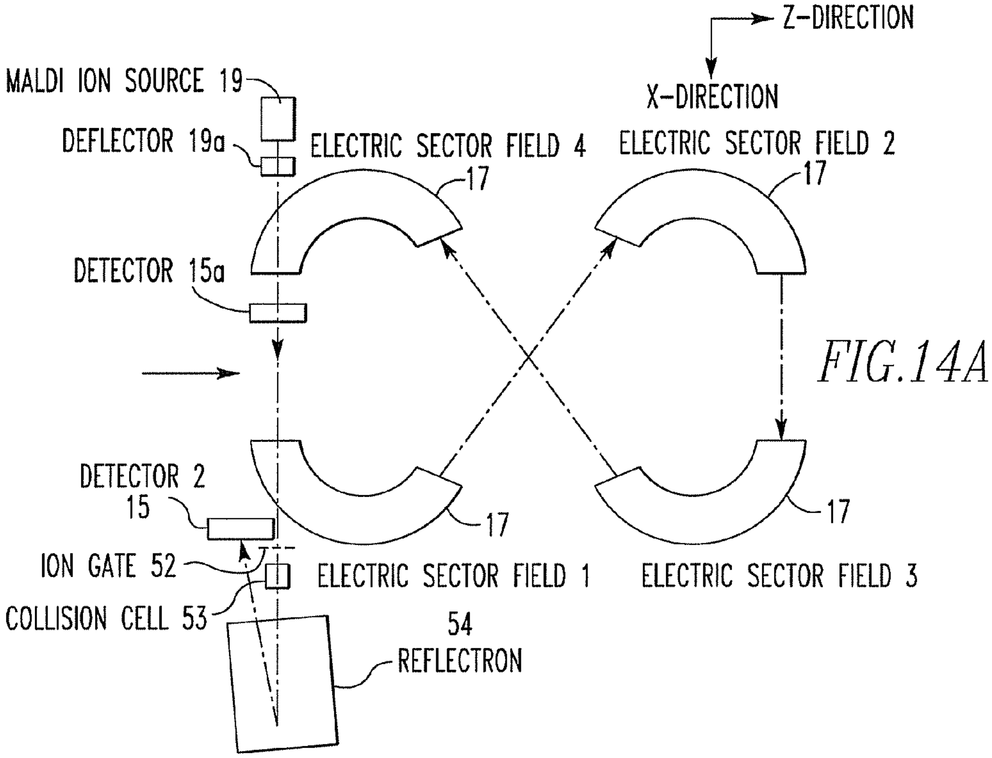
FIG. 14A shows views of a mass spectrometer according to a third aspect of the present invention as viewed from the Y-direction and FIG. 14B as viewed from the Z-direction.
Figure 14B:
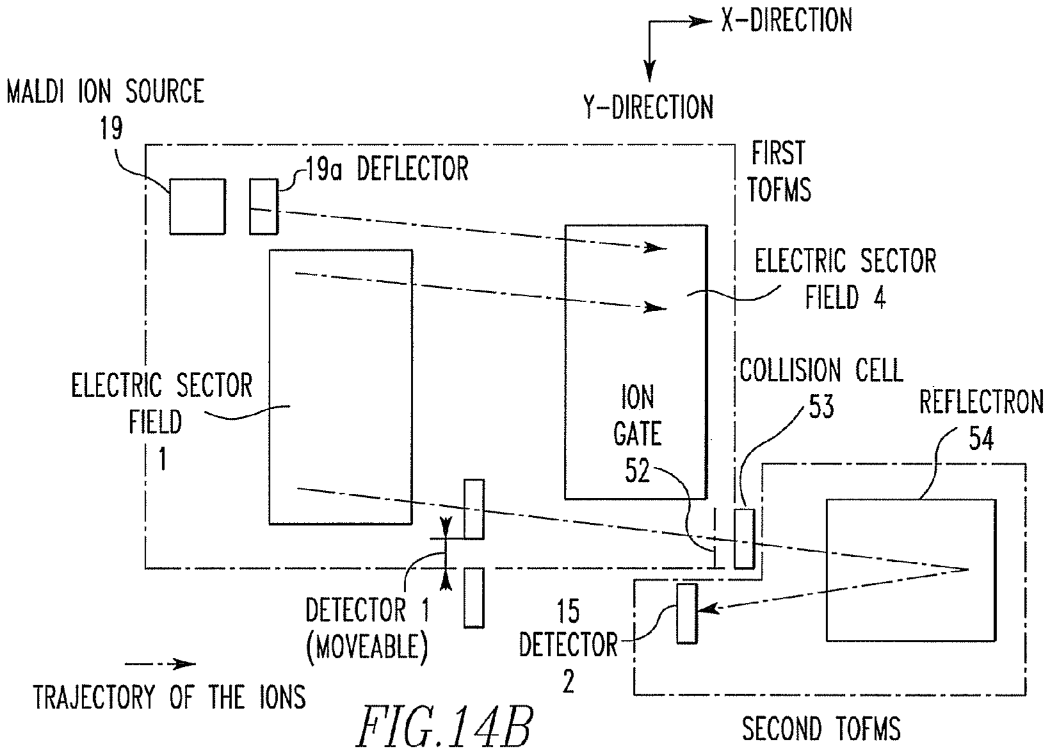

FIGS. 14A and 14B show a first embodiment of the third aspect of the invention. Like components are indicated by like reference numerals in both FIGS. 10 and 14A and 14B. FIG. 14A is a view of the apparatus as viewed from the Z-direction. FIG. 14B is a view of the apparatus as viewed from the direction of the arrow in FIG. 14A. The illustrated apparatus has a MALDI ion source 19, a deflector 19*a*, a first ion detector 15*a* (ion detector 1) for detecting ions, an ion gate 52 that receives the ions passed through the ion detector 1 and selects precursor ions, a collisional cell 53 in which the ions are fragmented, a reflectron field 54 into which the resulting fragment ions are entered, and a detector 15 (ion detector 2) for detecting the ions reflected from the reflectron field 54. The detector 1 can move as shown in FIG. 14B. The operation of the apparatus constructed in this way is next described.

A sample is ionized by the MALDI ion source 19 and accelerated by a pulsed voltage. The process is identical with the prior art up to this point. The ions exiting from the ion source 19 are adjusted in angle by a deflector 19*a* and enter an electric sector field 1. The ions pass through electric sector fields 1-4 in turn and make one revolution. At this time, the position in the Z-direction deviates from the position assumed in the previous turn and so the ions travel in the Z-direction while making circulations.

In the case of MS measurements, ions are detected using the ion detector 1 disposed on the trajectory. In the case of MS/MS measurements, the ion detector 1 is moved off the trajectory. The ions are moved straight toward the ion gate 52. When the ion gate voltage is off, the ions can pass through the ion gate 52. When the voltage is on, they cannot pass.

The ion gate 52 is turned off only during the time in which precursor ions pass. The user wants to select these precursor ions out of the ions undergone the final turn of revolution, and certain isotope peaks of the precursor ions are selected. The selected precursor ions enter the collisional cell 53 and collide with the inside collision gas, so that some of the ions are fragmented. The unfragmented precursor ions and product ions produced by the fragmentation pass through the reflectron field 54 and are detected by the detector 2. Since the time at which each ion is moved back out of the reflectron field 54 is different according to the mass of each ion and kinetic energy, the precursor ions and the product ions in each fragmentation path can be mass analyzed. Furthermore, according to this embodiment, the effects of isotope peaks can be eliminated. It is easier to interpret the mass spectrum. The accuracy of mass analysis can be improved.

According to an embodiment of the third aspect of the present invention, ionization performed in the ion source can consist of placing a sample on a conductive sample plate and illuminating the sample with laser light. This permits analysis of the ions produced by a MALDI.

Furthermore, according to an embodiment of the third aspect of the invention, ionization performed in the ion source can be a MALDI. This permits analysis of ions produced by the MALDI.

In addition, according to an embodiment of the third aspect of the invention, delayed extraction technique can be used in the means for accelerating the ions. This permits improvement of the time focusing at an intermediate focal point. Hence, the accuracy of mass analysis can be enhanced.

Figure 15A:
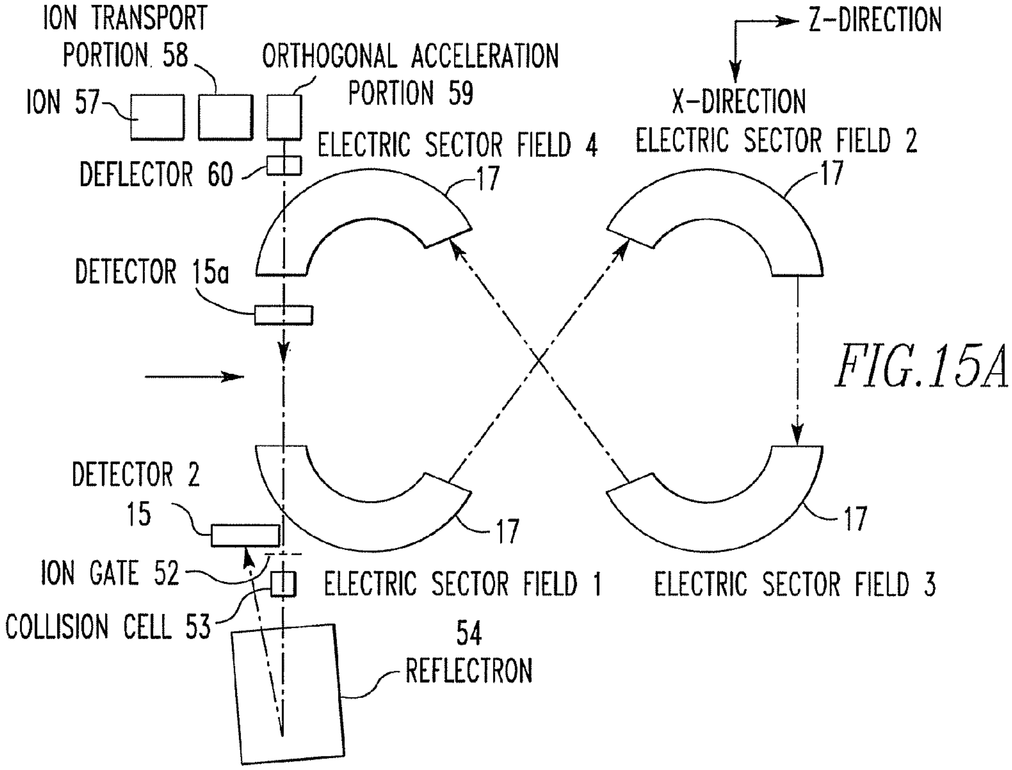
FIG. 15 is a view of another embodiment of the third aspect, as viewed from the same direction as in FIG. 14.
Figure 15B:
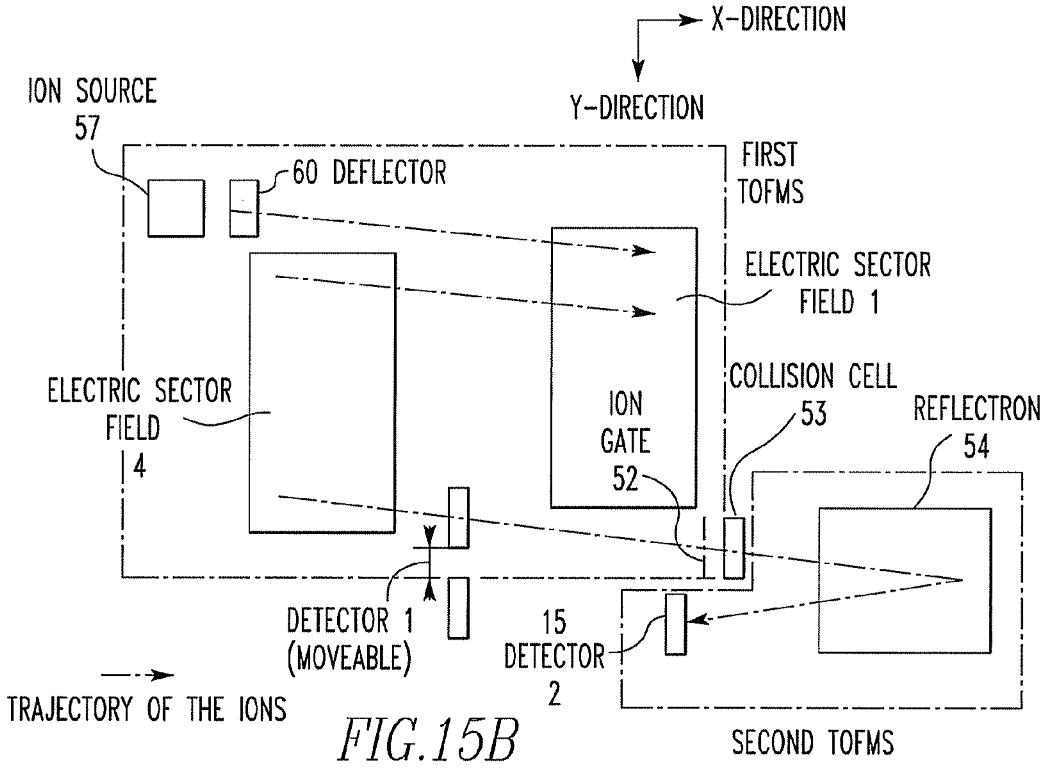

FIGS. 15A and 15B show another embodiment of the third aspect of the present invention. Like components are indicated by like reference numerals in both FIGS. 14A and 14B and 15A and 15B. FIG. 15A is a view of the apparatus as viewed from the Y-direction. FIG. 15B is a view of the apparatus as viewed from the direction of the arrow in FIG. 15A. The illustrated apparatus has an ion source 57, an ion source transport portion 58, an orthogonal acceleration portion 59, and a deflector 60. The other configurations are identical with those shown in FIG. 14A. The operation of the apparatus constructed in this way is next described.

A sample is ionized in the ion source 57 and transported into the orthogonal acceleration portion 59 by the ion transport portion 58. The instrumentation is identical with the prior-art instrumentation up to this point. The ions emerging from the orthogonal acceleration portion 59 are adjusted in angle by the deflector 60 and enter the electric sector field 1. The ions pass through the electric sector fields 1-4 in turn and make one revolution. At this time, the position in the Y-direction deviates from the position assumed in the previous turn and so the ions move in the Z-direction while making circulatory motions.

In the case of MS measurements, ions are detected using the ion detector 1 disposed on the trajectory. In the case of MS/MS measurements, the ion detector 1 is moved off the ion trajectory. The ions are made to move straight toward the ion gate 52. When the ion gate voltage is off, the ions can pass through the gate 52. When the voltage is on, they cannot pass. The ion gate is turned off only during the time in which precursor ions pass. The user wants to select these precursor ions out of the ions undergone the final turn of revolution, and certain isotope peaks of the precursor ions are selected.

The selected precursor ions enter the collisional cell 53 and collide with the collision gas inside the cell. As a result, the ions are fragmented. The unfragmented precursor ions and fragmented product ions pass through the reflectron field 54 and are detected by the ion detector 2. Since the time at which the ions are moved back out of the reflectron field 54 is different according to the masses of the precursor ions and the kinetic energies, the precursor ions and product ions in each fragment path can be mass analyzed.

According to this embodiment, the ions are made to travel in a helical trajectory. This permits mass analysis of precursor ions with high selectivity.

According to an embodiment of the third aspect of the invention, the fragmenting means can be CID performed under the condition where the collisional cell is filled with gas. According to this embodiment, ions can be fragmented efficiently.

Furthermore, according to embodiments of the third aspect of the invention, only certain isotope peaks of precursor ions can be selected with a helical-trajectory TOF-MS using the aforementioned TOF-MS. According to this embodiment, only certain isotope peaks of precursor ions can be selected.

Furthermore, according to embodiments of the third aspect of the invention, the certain isotope peaks can be made monoisotopic ions of the precursor ions. According to this embodiment, mass analysis can be performed precisely because the certain isotope peaks are monoisotopic ions of the precursor ions.

According to the third aspect of the invention described so far, the selectivity of the precursor ions can be improved over the prior art and monoisotopic ions can be selected, using a helical-trajectory TOF-MS unit as its first TOF-MS unit. As a result, it is easier to interpret the spectrum of the product ions. Mass accuracy can also be improved.

Figure 16A:
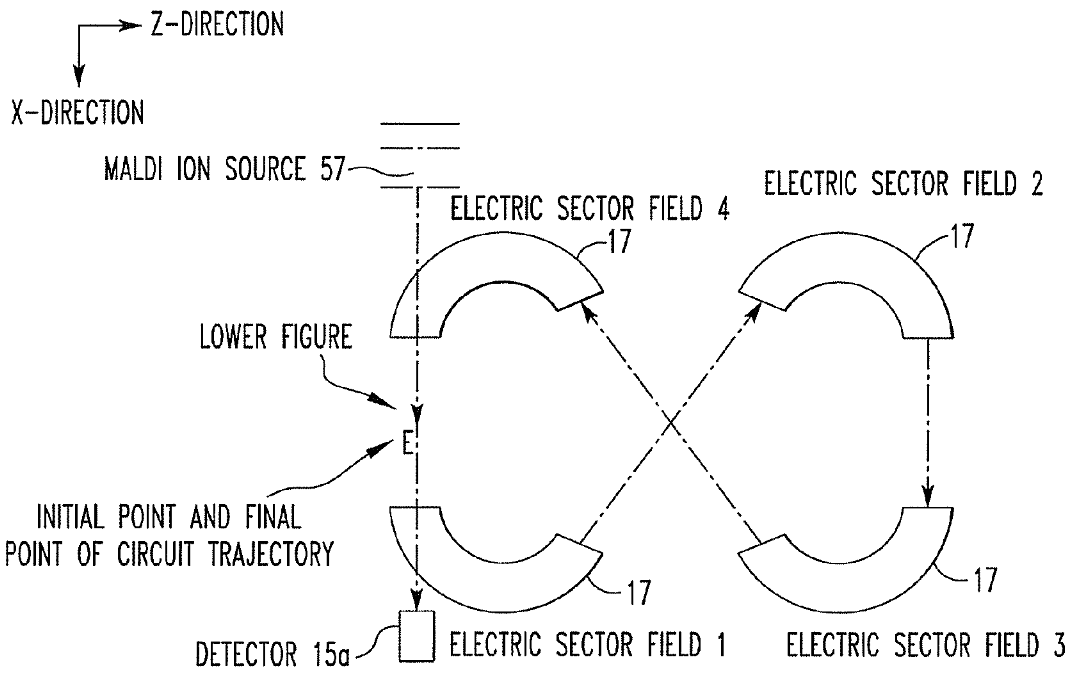
FIG. 16A shows views of a mass spectrometer according to a fourth aspect as viewed from the Y-direction and FIG. 16B as viewed from the Z-direction.
Figure 16B:
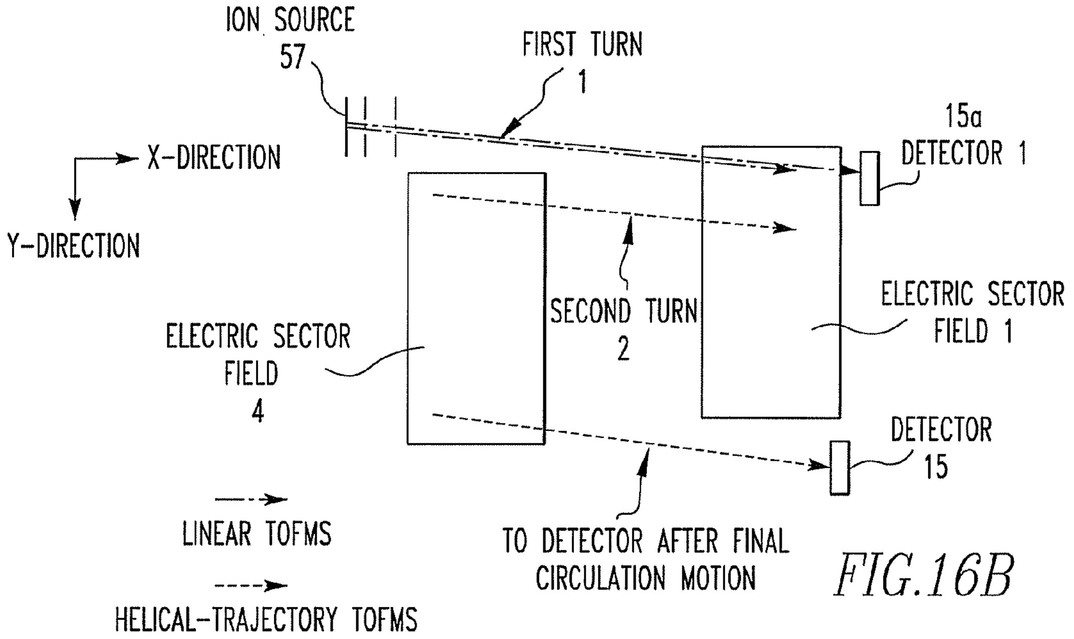

FIGS. 16A and 16B show one embodiment of a fourth aspect of the present invention. FIG. 16A is a view of the apparatus as viewed from the Y-direction. FIG. 16B is a view of the apparatus as viewed from the direction of the arrow in FIG. 16A. The illustrated apparatus has a MALDI ion source 57, an ion detector 1 (15*a*), and electric sector fields 1-4 (17). In FIG. 16A, the starting point and end point of a circuit portion are indicated by E. In FIG. 16B, the bold broken lines indicate the ion trajectory in a linear TOF-MS. The thin broken lines indicate the ion trajectory in a helical-trajectory TOF-MS. An ion detector 2 (15) detects the final turn on the trajectory of the ions. The operation of the apparatus constructed in this way is next described.

Ions are generated by the MALDI ion source 57 and accelerated in a pulsed manner by delayed extraction technique. The process is identical with the prior-art technique up to this point. The ion detector 1 is a detector for linear TOF-MS. Where measurements are made using the apparatus as a linear TOF-MS, the voltages on the electric sector fields 1 and 4 are turned off. The ions are made to travel straight and detected by the ion detector 1.

Where measurements are performed using the apparatus as a helical-trajectory TOF-MS, the voltages on the electric sector fields 1 and 4 are turned on. The ions travel in a helical trajectory and arrive at the ion detector 2. For each individual ion, the time at which the pulsed voltage is started to be applied and the arrival time to the ion detectors 1 and 2 are different according to mass. Thus, mass analysis is performed.

According to the fourth aspect of the invention, linear TOF-MS and helical-trajectory TOF-MS units are combined. Thus, measurements can be performed while making use of the features of both TOF-MS units.

According to an embodiment of the fourth aspect, a sample on a conductive sample plate can be ionized by laser irradiation. In this way, the sample on the sample plate can be ionized by laser irradiation and analyzed.

According to an embodiment of the fourth aspect, a MALDI can be used as an ionization method used in the ion source. In this configuration, ions produced by the MALDI can be analyzed.

According to an embodiment of the fourth aspect, delayed acceleration can be used as the means for accelerating the ions. In this structure, the time focusing properties at the intermediate focal point can be improved using delayed extraction technique.

According to an embodiment of the fourth aspect, the same sample can be measured alternately by a linear TOF-MS and a helical-trajectory TOF-MS using the aforementioned apparatus. In this configuration, the measurement accuracy of mass analysis can be improved by measuring the sample alternately by the linear TOF mass analyzer and helical-trajectory TOF-MS. Furthermore, according to an embodiment of the fourth aspect, the sample can be measured by the linear TOF mass analyzer and helical-trajectory TOF-MS at the same time using the above-described apparatus. In this case, ions not fragmented in the helical-trajectory TOF-MS are measured. In the linear TOF-MS, neutral particles which are fragmented and generated in an intermediate process are measured.

Figure 17:
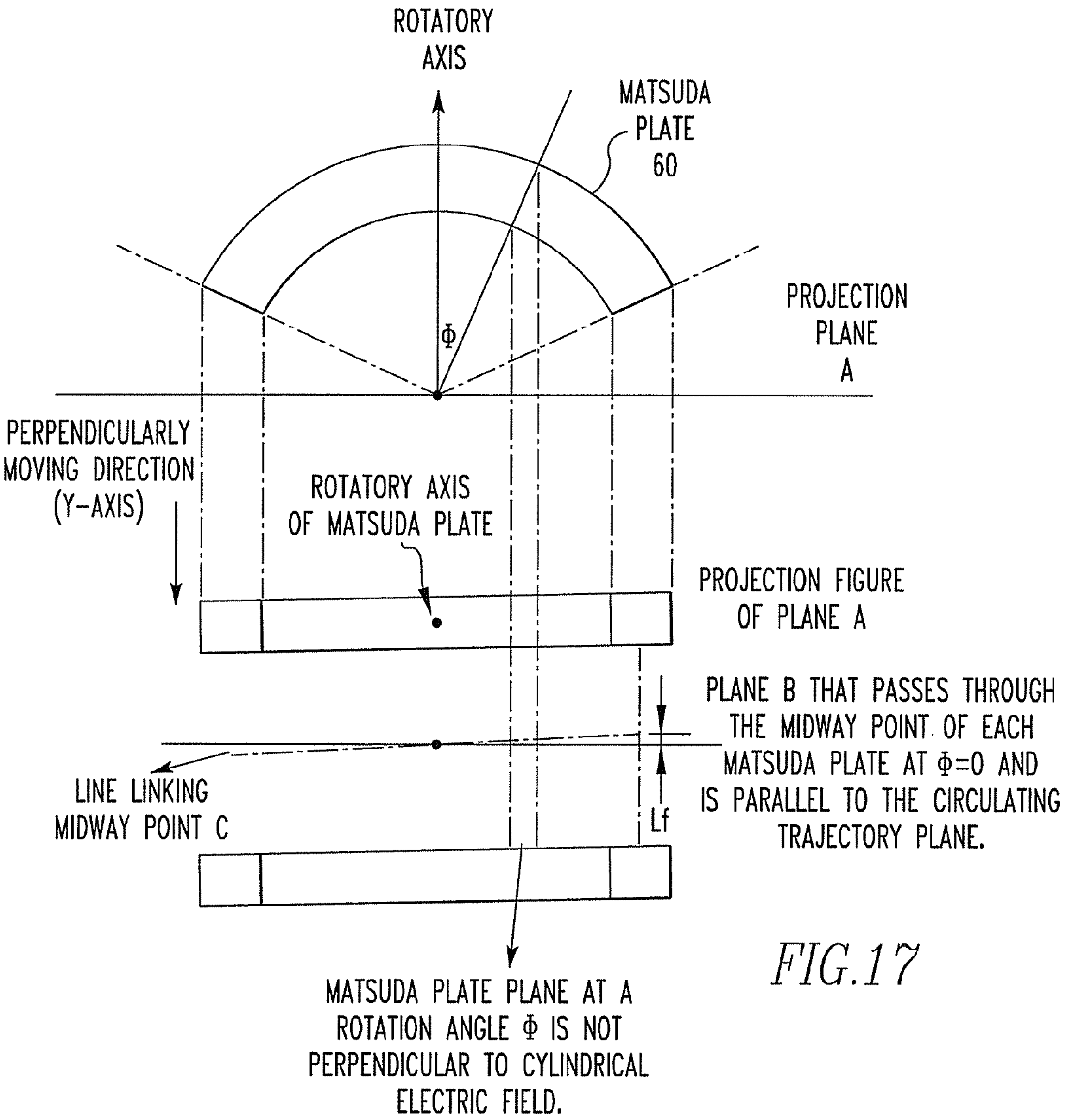
FIG. 17 is a view of an embodiment of a fifth aspect of the invention.
Figure 39:
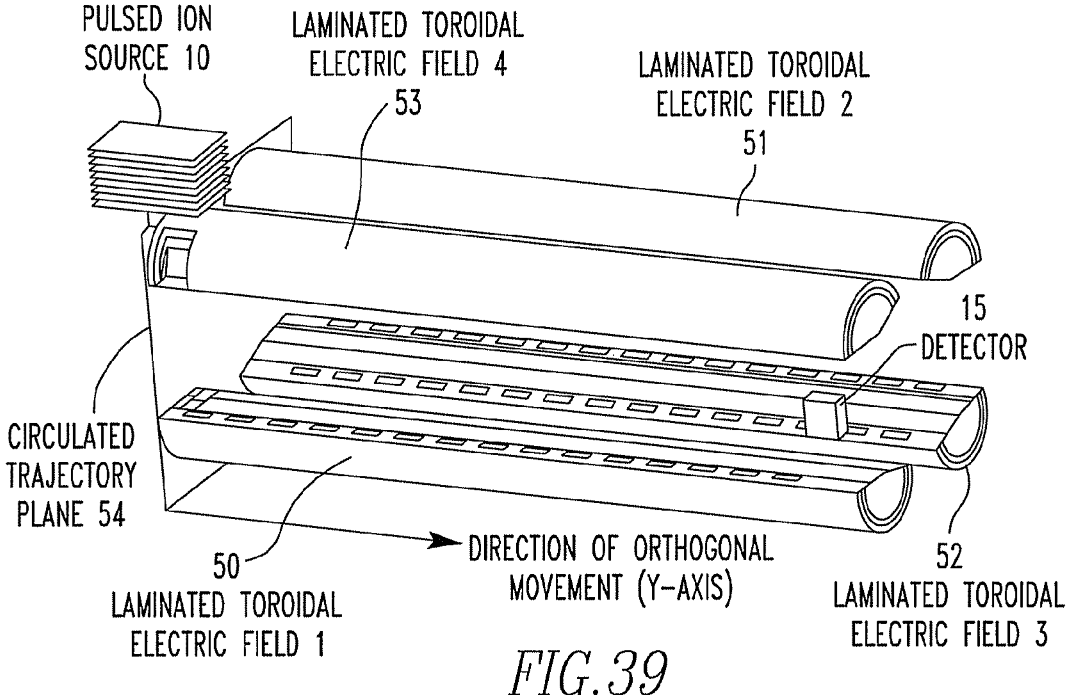
FIG. 39 is a diagram showing an example of the whole configuration of a helical-trajectory TOF-MS.
Figure 40:
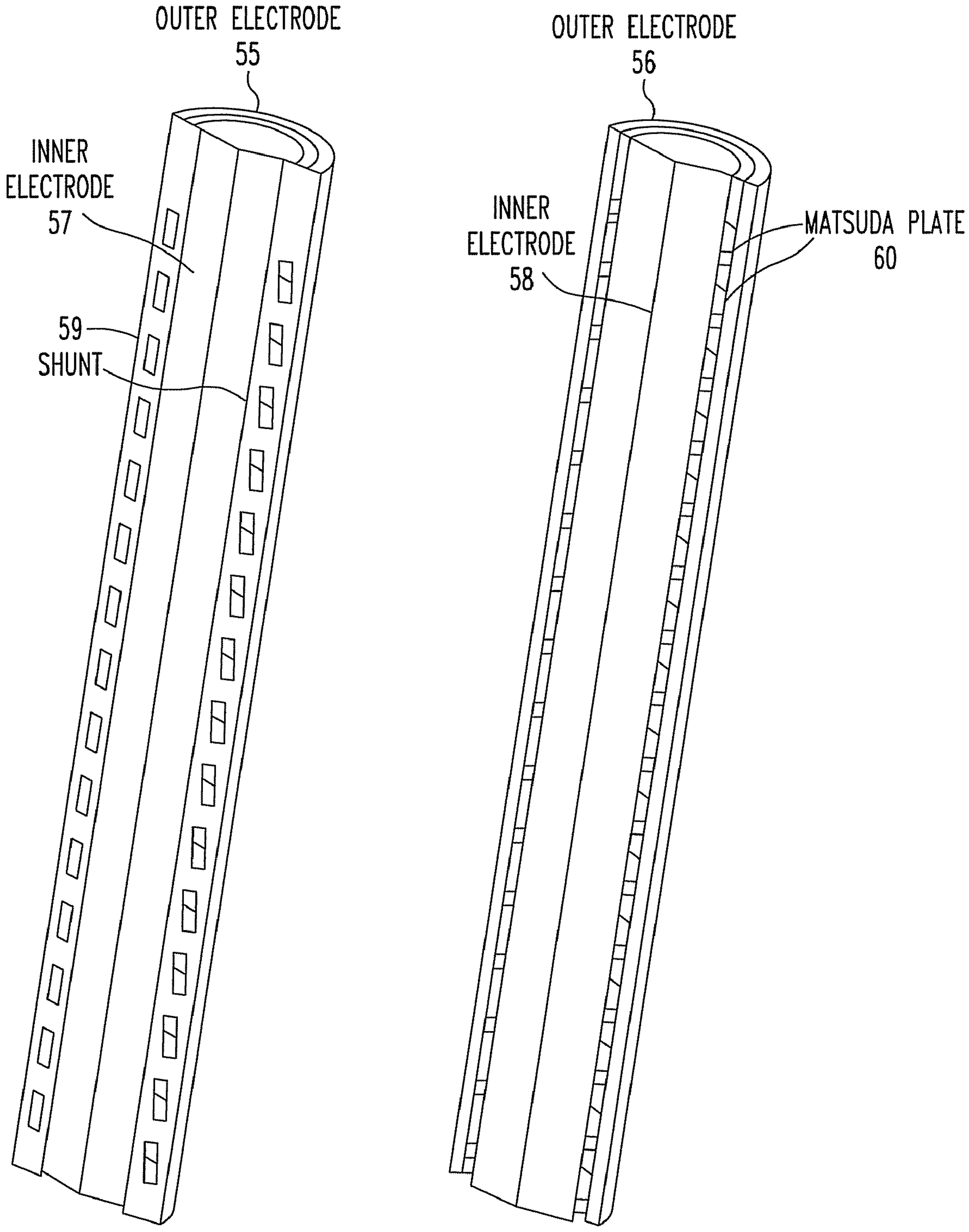
FIG. 40 illustrates laminated toroidal electric fields.
Figure 41:
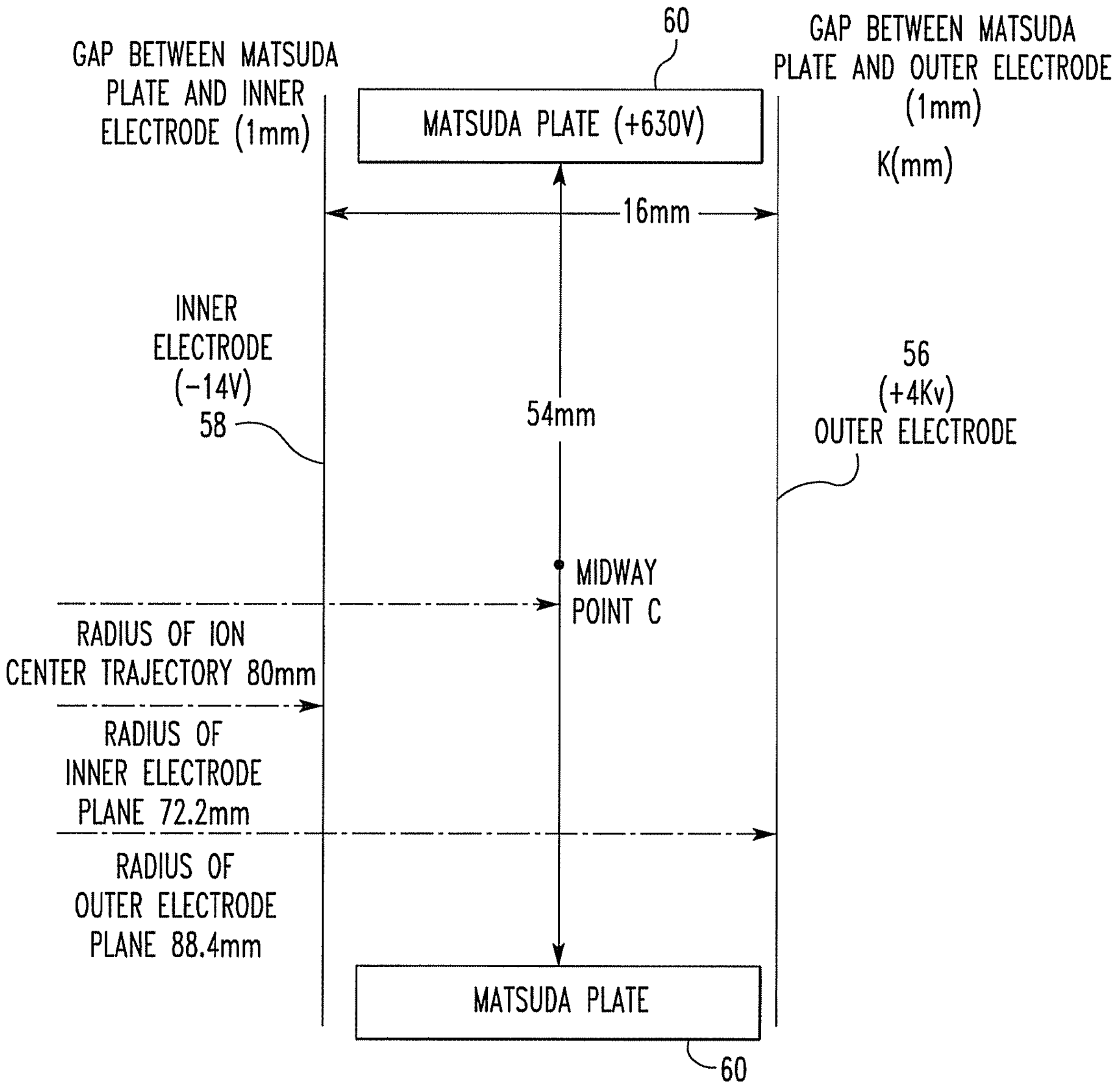
FIG. 41 is a diagram of a cross-sectional model at an arbitrary angle of rotation when screwed Matsuda plates are used.
Figure 42:
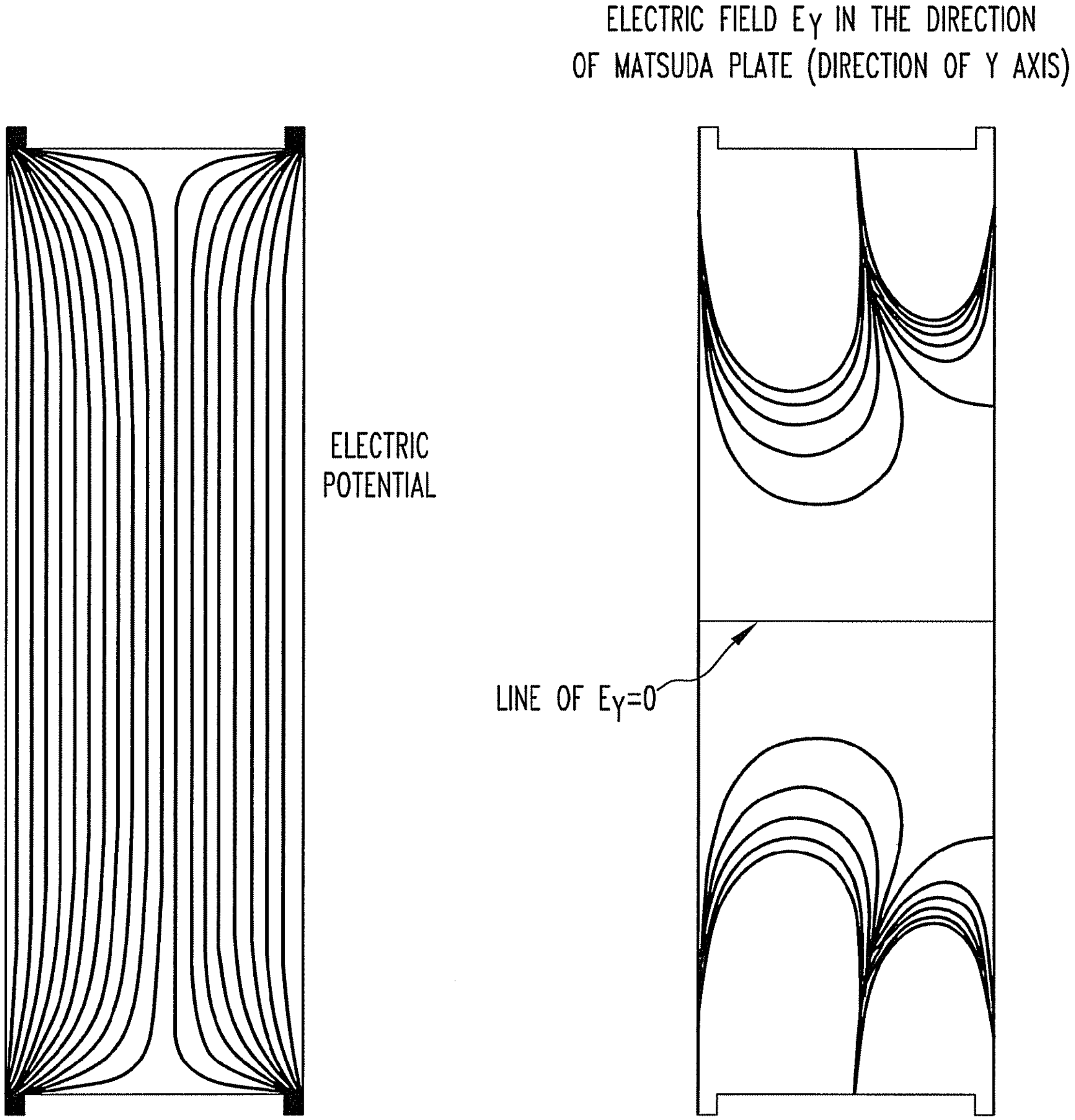
FIG. 42 is a diagram of contour lines used for electric potential and field analysis of screwed Matsuda plates.

A fifth aspect of the present invention is next described. An apparatus according to the fifth aspect is similar to the apparatus of FIG. 39 in appearance and configuration except that the Matsuda plates are of the arcuate type. The components of the apparatus according to the fifth aspect are a pulsed ion source, laminated toroidal electric fields 1-4, and an ion detector. FIG. 17 shows an embodiment of the fifth aspect, depicting one layer in which the laminated toroidal electric fields are present. The operation of the apparatus constructed in this way is next described.

According to the fifth aspect of the invention, ions accelerated by the same kinetic energy in the pulsed ion source are mass separated by making use of their different velocities due to their different masses, which appear as different arrival times at the detector. The ions emerging from the ion source enter the first layer of the laminated toroidal electric fields at a certain angle of incidence and pass through the first layers of the laminated toroidal electric fields 2-4 in turn. The ions which have made one revolution pass through a position deviated from the position in the first layer in the direction of orthogonal movement according to the angle of incidence. In this way, the ions pass through even the first through fifteenth layers of the laminated toroidal electric fields 1-4 in turn and are detected by the detector.

A schematic of the instrumentation of an embodiment of the fifth aspect is similar to that of the prior art. However, each Matsuda plate is an arcuate electrode instead of a screwed electrode. The toroidal electric field produced in each layer of the laminated toroidal electric fields differs according to whether the Matsuda plate constituting the toroidal electric field is a screwed electrode or an arcuate electrode. The difference is described below. The arrangement used where arcuate electrodes are used is also described. In the following description, it is assumed based on the model described in the prior art that arcuate Matsuda plates each having a thickness of 6 mm are inserted into a cylindrical electric field having a center trajectory of 80 mm. The spacing between the Matsuda plate surfaces is 54 mm. The inner electrode plane of the cylindrical electric field has a radius of 72.4 mm and an outer electrode plane has a radius of 88.4 mm. The rotational angle is 157.1°. The circulating trajectory plane of a MULTUM II is magnified by a factor of 1.6. It is also assumed that the inner voltage is −4 kV, the outer voltage is +4 kV, and the Matsuda plate voltage is +630 V.

Each Matsuda plate is tilted by the ion incidence angle relative to the axis of rotation of the Matsuda plate that is the intersection of the midway plane of the angle of rotation (plane spaced from the end surface of the electrode by 78.55°) and the midway plane of the thickness of the Matsuda plate. It is then assumed that a projection plane A is a plane perpendicular to the axis of rotation of the Matsuda plate. The laminated toroidal electric fields are produced by a cylindrical electric field in which plural arcuate electrodes are tilted in a parallel relation to each other. FIG. 17 is a view obtained by projecting two Matsuda plates forming one layer of one laminated toroidal electric field onto a circulating trajectory plane and onto the projection plane A (described later). The plane A is orthogonal to the circulating trajectory plane. Since the arcuate electrodes are tilted, the plane which forms the toroidal electric fields of the Matsuda plates and which is projected onto the projection plane A is a straight line.

An angle of rotation $\phi$ is defined based on the midway plane (spaced from the end plane of the electrode by 78.55°) of the angle of rotation of the cylindrical electric field as shown in FIG. 17. In the following example, $\phi$ is positive (i.e., one side of the electrode (half of the electrode)). Where a cylindrical electrode is used, the deviation of the center trajectory of the ions from the ideal center trajectory of ions is examined. Where the angle $\phi$ is negative, the polarity is opposite to the polarity assumed in a case where the deviation is positive. On an 8-shaped trajectory, if the ions rotate through the laminated toroidal electric fields 1 and 4 forwardly, the rotation through the field 2 is reverse to the rotation through the field 3. In the case of reverse rotation, the polarity of positional deviation is opposite to the polarity assumed in the case of forward rotation.

Finally, a plane B that passes through the midway point of each Matsuda plate at $\phi=0$ and is parallel to the circulating trajectory plane is defined. In cases where an arcuate electrode and a screwed electrode are used as the Matsuda plates, respectively, the tilt of the arcuate electrode that brings the midway positions of the Matsuda plates on the center trajectory of 80 mm at the end plane of the cylindrical electrode into coincidence is now discussed. Where the angle of incidence is 1.642°, the distance Lf between the center trajectory of the ions at the end surface and the plane B is given by $$Lf=2\times 80\times \pi\times(78.55/360)\times\tan 1.642=3.144(\text{mm})$$

It can be seen from FIG. 17 that the center trajectory is 80 mm and so the tilt θa of the arcuate electrode is given by $$\theta a=\tan^{-1}(3.144/80)=2.25(°)$$

Where the arcuate electrode is tilted, the distance to the center trajectory is different according to the angle of rotation ϕ. Where ϕ=0°, the distance is 80 mm. At the end surface (ϕ=±87.55°), the distance is 80.06 mm=80/cos 2.25 at maximum. This difference affects the variations among the Matsuda plates and electrodes due to the angle of rotation ϕ and the distance between the Matsuda plates. Where the angle of incidence is sufficiently small, the difference is so small that it can be neglected.

Figure 18:
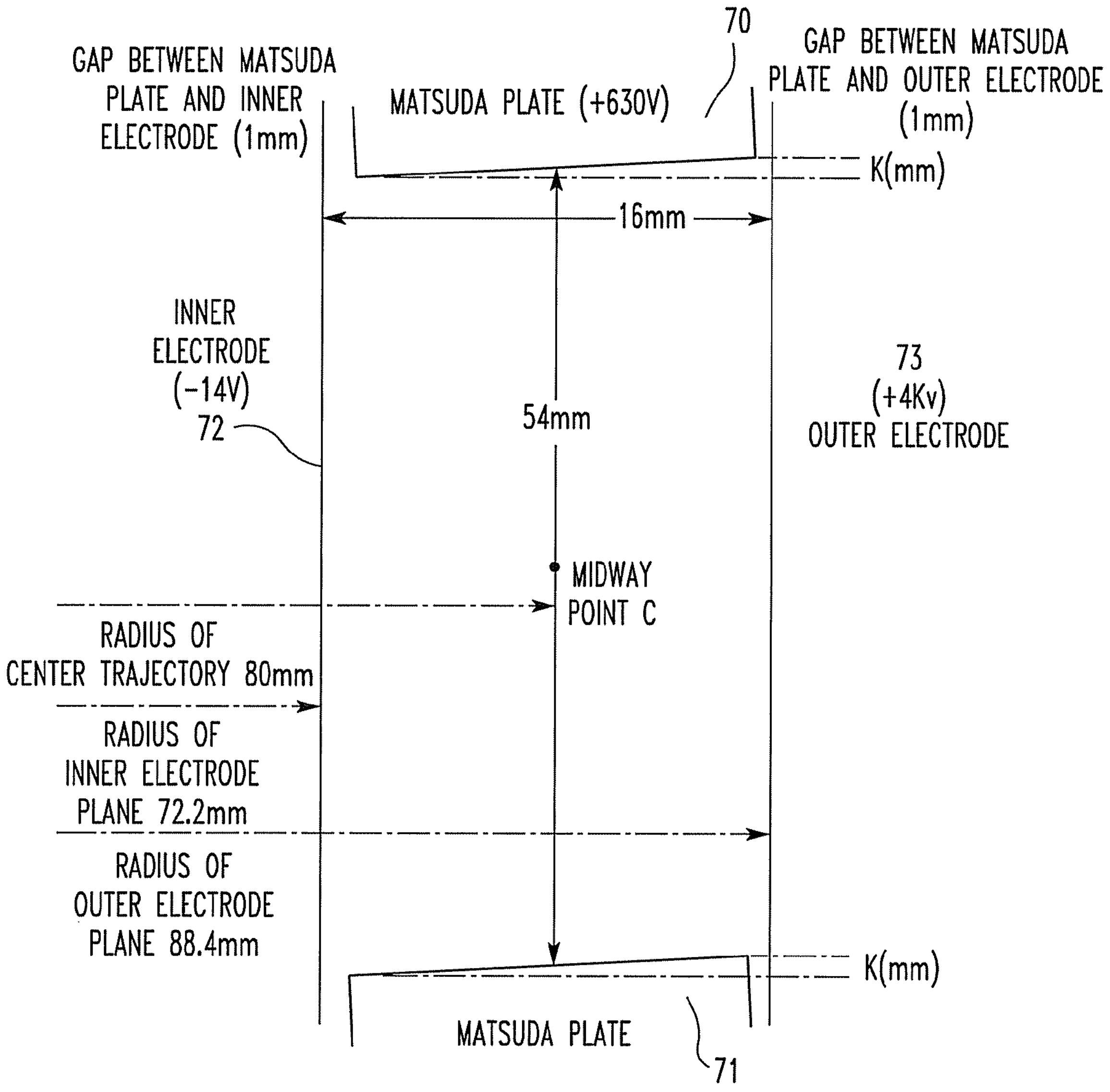
FIG. 18 is a view showing a cross-sectional model at an arbitrary angle of rotation when arcuate Matsuda plates are used.

It can be seen from FIG. 17 that at a certain angle ϕ, the distance between the Matsuda plate plane and the plane B is different between the inner line and the outside. That is, outside ϕ=0°, the angle made between the Matsuda plate and the cylindrical electrode does not form right angles but is a cross section represented by a model as shown in FIG. 18, which shows a cross-sectional model at an arbitrary angle of rotation when arcuate Matsuda plates are used. Shown in the figure are Matsuda plates 70 (+630 V) and 71. Also shown are an inner electrode 72 (−4 kV) and an outer electrode 73 (+4 kV).

The width of the Matsuda plates is set to 14 mm to form a gap of about 1 mm between the inner electrode and each Matsuda plate and between the outer electrode and each Matsuda plate. The difference K between the outside and inside parallel to the cylindrical electric field plane at some cross section is given by $$K=Tmp\times\tan\phi\times\sin\theta mp=0.40\times\tan\phi \tag{6}$$

Based on the model of FIG. 18, the difference K was varied in increments of 0.1 mm. An electric field ($E_Y$) analysis in the direction of orthogonal movement within a toroidal electric field was performed.

Figure 19:
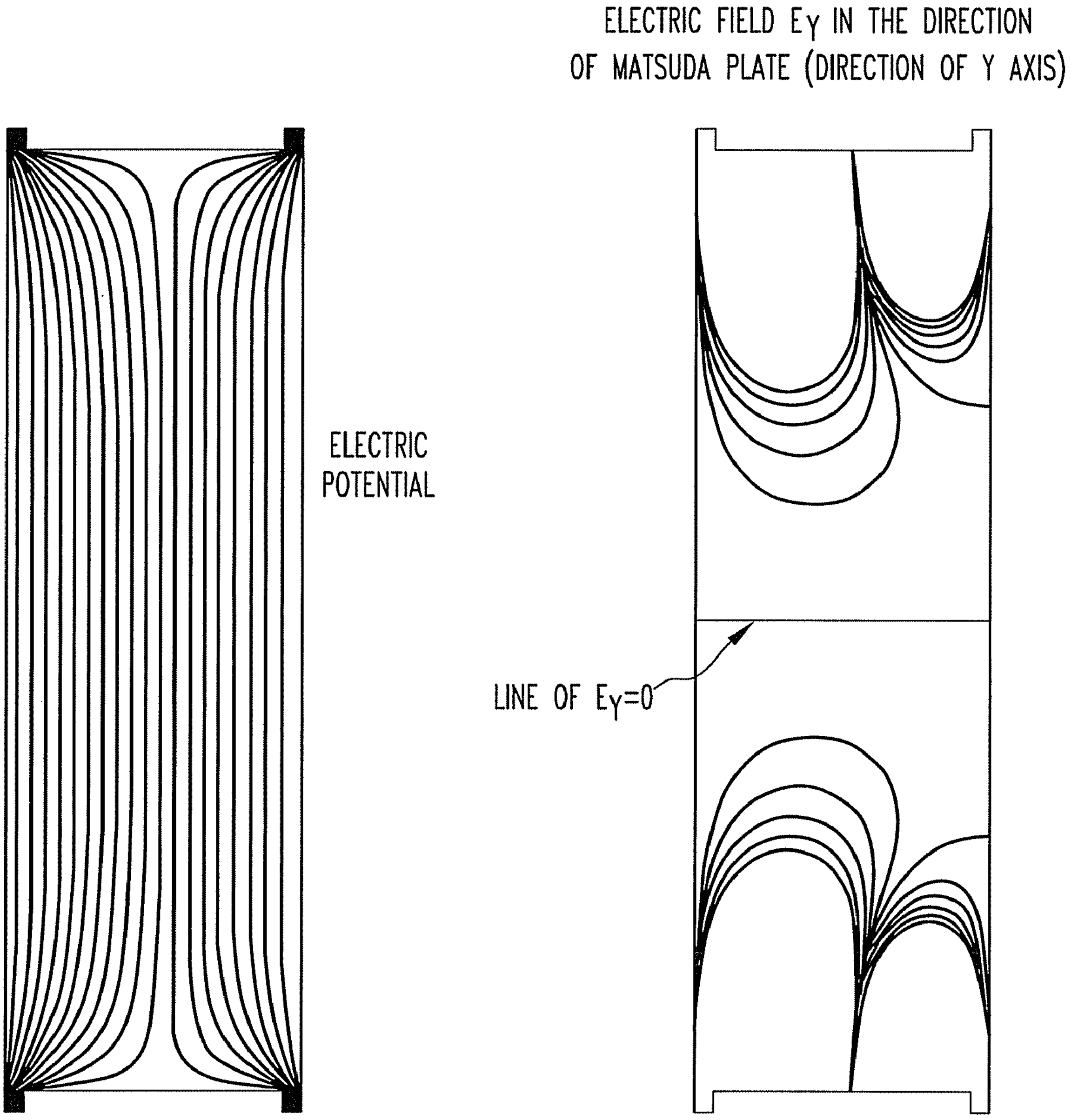
FIG. 19 shows views of a cross-sectional model at an arbitrary angle of rotation when screwed Matsuda plates are used.
Figure 20:
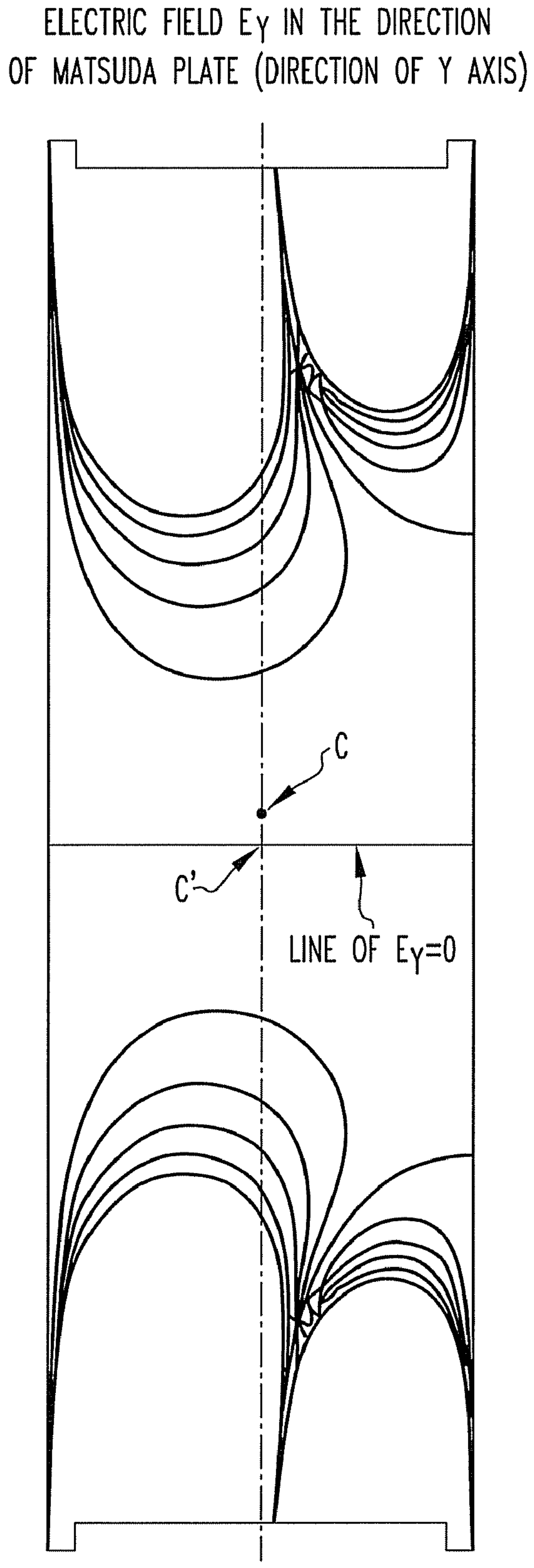
FIG. 20 is a view illustrating electric field analysis of arcuate Matsuda plates performed in the Y-direction.

Similarly to the screwed electrode model of FIG. 19, the model of FIG. 18 was computed in a two-dimensional axisymmetric system. In practice, axisymmetry is not achieved. However, the tendencies of electric potential and potential distribution can be grasped. The results are shown in FIG. 20. First, at a cross section at some angle ϕ, a point located at the midway point of a Matsuda plate on a line of a radius 80 mm of the center trajectory of the ions was defined as the midway point C. With respect to the electric field, a line giving $E_Y=0$ was almost parallel to the circulating trajectory. The electric field in the Y-direction was almost symmetrical with respect to the line $E_Y=0$.

Figures 21, 22:
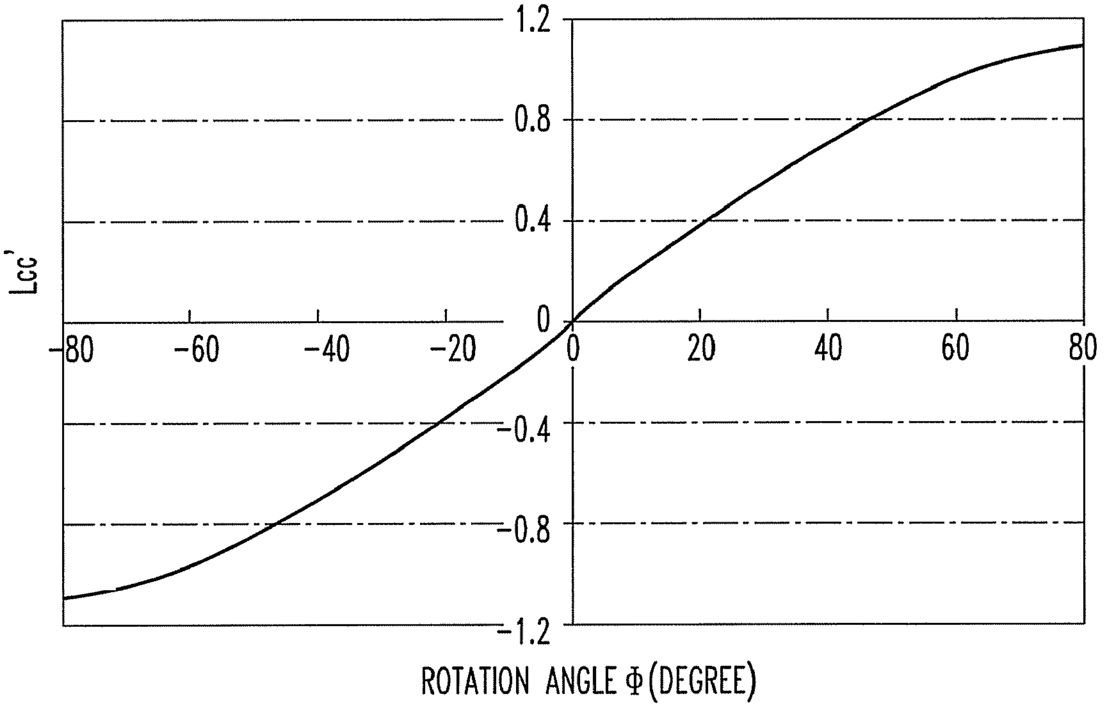
FIG. 21 is a diagram illustrating the relation between Matsuda plate deviation R and Loc.
FIG. 22 is a diagram illustrating the correlation between angle of rotation ϕ and Loc'.

However, the line $E_Y=0$ is in a position deviating from the midway point C (see FIG. 20). Let Lcc' be the distance between c and c'. Examination of the correlation with R reveals that the distance is almost in proportion to R and that its coefficient is 2. FIG. 21 shows the relation between the Matsuda plate deviation R and Loc'.

As already described in the prior art, the center trajectory of the ions should be a symmetrical position with respect to the Y-direction. It may be considered as a point c' at which the line giving $E_Y=0$ and the line of radius 80 mm of the center trajectory of the ions intersect. Based on the relation of FIG. 21, the relation between the angle of rotation ϕ and Loc' in a case where the tilt of the Matsuda plate is 2.25° is shown in FIG. 22. FIG. 22 is a diagram showing the relation between the angle of rotation ϕ and Loc'. Loc' is plotted on the vertical axis. The angle of rotation ϕ is plotted on the horizontal axis.

Then, the deviation between the midway point c of the Matsuda plate at some angle of rotation ϕ and the position of the center trajectory is examined. Since ions make motion at the same tilt as the incidence angle to the circulating trajectory plane at all times, the center trajectory is in proportion to the angle of rotation. Therefore, the distance Lo from the plane B is given by $$Lo=-Lf\times\phi/\phi f \tag{7}$$

where ϕf is the angle of rotation ϕ (157.1/2=78.55) at the end surface. Lf is the position of the center trajectory (=(2×80×π×78.55/360)×tan 1.642) at the end surface of the electrode. Therefore, in the present case, we have $$\begin{aligned} Lo &= ((2\times 80\times\pi\times 78.55/360)\times\tan 1.642)\times\phi/78.55 \\ &= -0.04\phi \end{aligned}$$

In contrast, the distance Lc of the midway point C from the plane B is converted into a straight line if the line connecting the midway point C is projected onto the plane A as shown in FIG. 17. Furthermore, the position at the end surface is substantially the same as the center trajectory. Therefore, $$Lc=-Lf\times\sin\phi/\sin\phi f \tag{8}$$

Consequently, $$\begin{aligned} Lp &= ((2\times 80\times\pi\times 78.55/360)\times\tan 1.642)\times\sin\phi/\sin 78.55 \\ &= -3.208\sin\phi \end{aligned}$$

Figure 23:
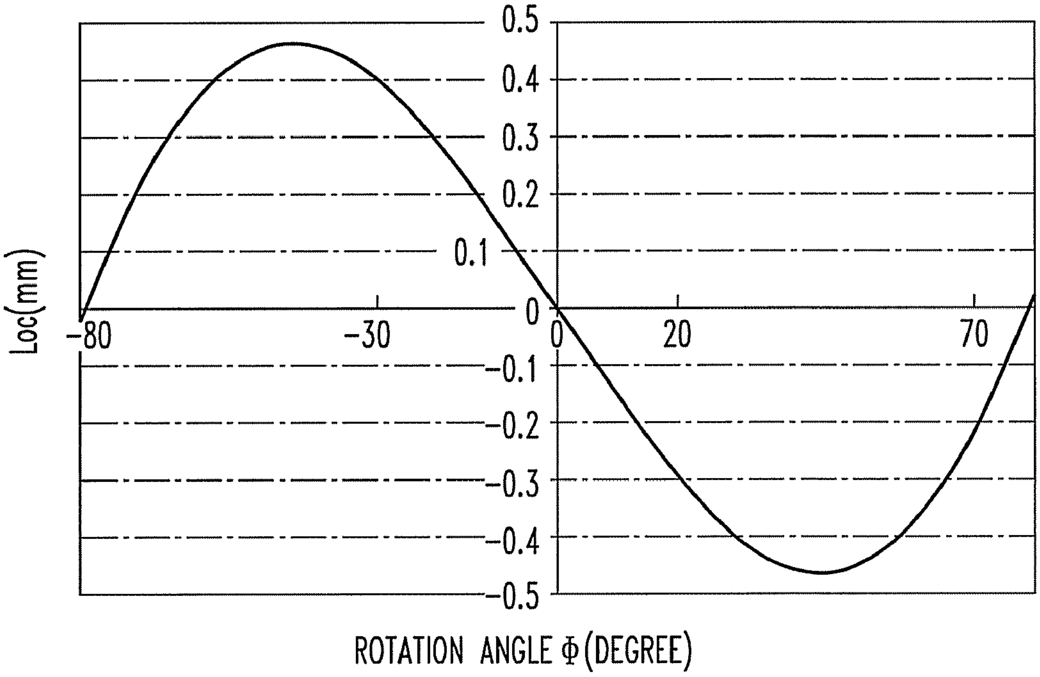
FIG. 23 is a diagram illustrating the correlation between angle of rotation ϕ and Loc.

The angle of rotation ϕ and the deviation Loc (=Lc−Lo) between the midway point C of the Matsuda plate and the center trajectory are shown in FIG. 23, where Loc is plotted on the vertical axis, while the angle of rotation ϕ is plotted on the horizontal axis.

Figure 24:
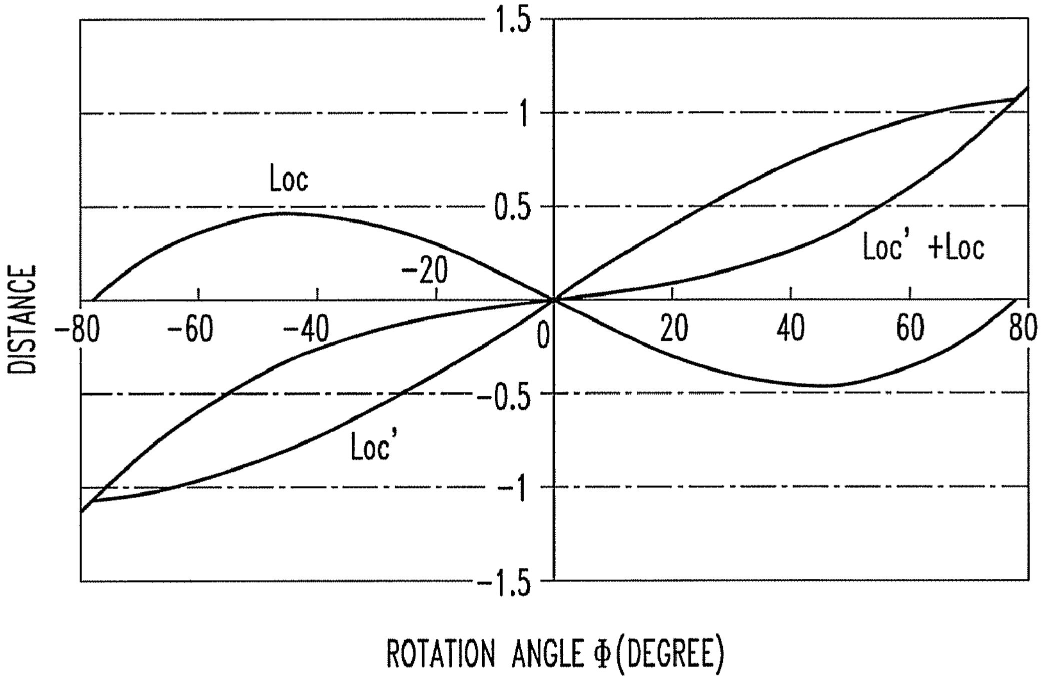
FIG. 24 is a diagram illustrating the correlations of angle of rotation ϕ with Loc', Loc, and (Loc'+Loc)

The sum of Loc' and Loc is equal to the deviation between the point giving $E_Y=0$ on the line of radius 80 mm of the center trajectory of the ions at a cross section at some angle of rotation ϕ and the actual center trajectory of the ions. This is illustrated in FIG. 24, where distance (mm) is plotted on the vertical axis, whereas the angle of rotation ϕ (in degrees) is on the horizontal axis. Loc' and Loc cancel each other until the angle of rotation reaches about 40° and so the deviation is small. However, at angles exceeding about 40°, as the angle of rotation ϕ increases, the deviation increases.

Figure 25:
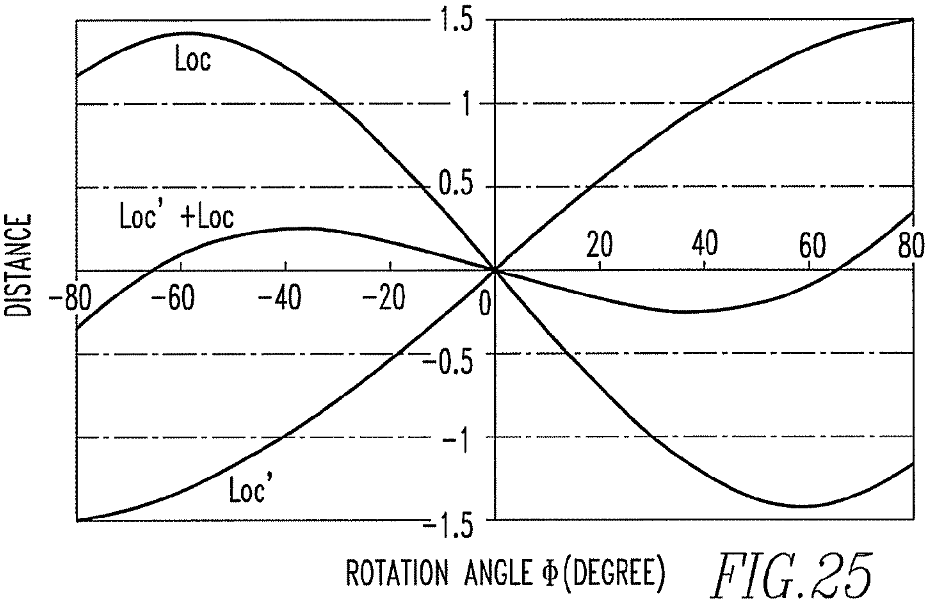
FIG. 25 is a diagram illustrating the correlation of angle of rotation ϕ with Loc', Loc, and (Loc'+Loc) in a case where the angle of incidence is 1.642° and the Matsuda plates are tilted at an angle of 3.1°.
Figure 26:
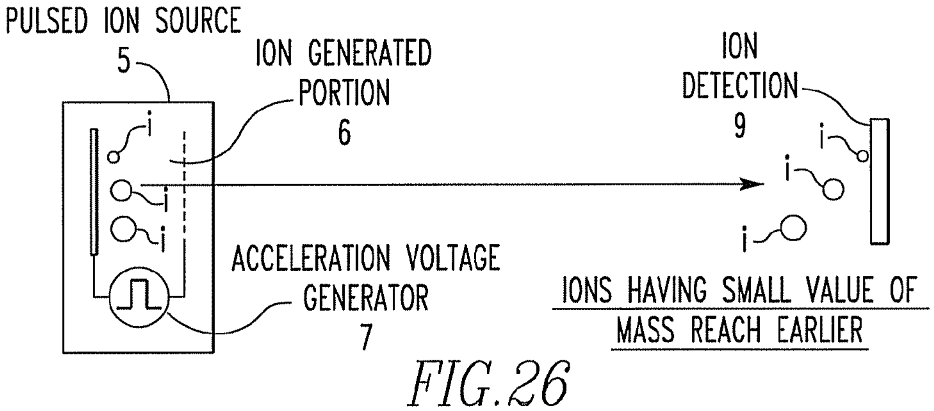
FIG.26 PRIOR ART
FIG. 26 is a diagram illustrating the principle of operation of a linear TOF-MS.
Figure 27:
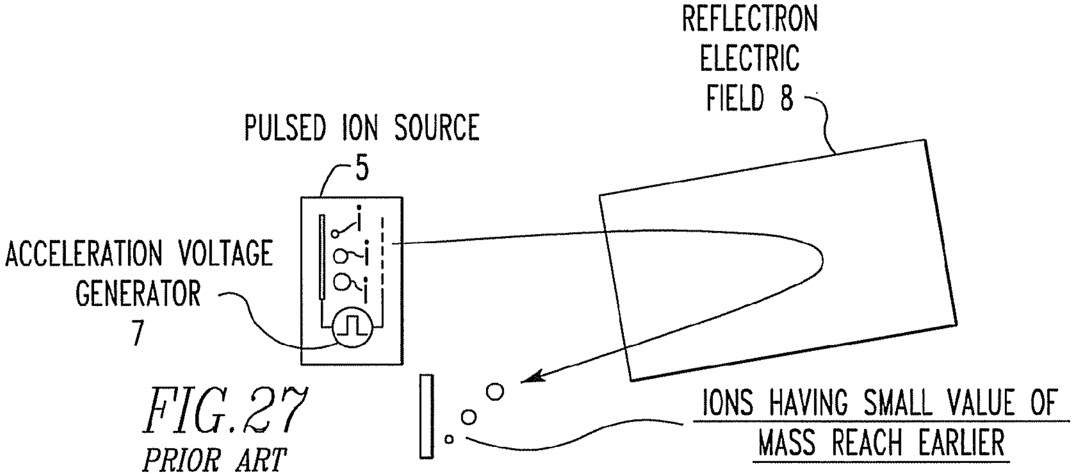
FIG.27 PRIOR ART
FIG. 27 is a diagram illustrating the principle of operation of a reflectron TOF-MS.

Although it is impossible to completely cancel out the deviation, the deviation can be reduced averagely by making the tilt of the Matsuda plate different from the incidence angle. FIG. 25 shows the correlation of the angle of rotation ϕ with Loc' and Loc in a case where the incidence angle of ions is kept at 1.642° and the tilt of the Matsuda plate is set to 3.1°. In FIG. 25, the distance (mm) is plotted on the vertical axis, while the angle of rotation ϕ is on the horizontal axis. In this case, the deviation of the line connecting $E_Y=0$ at every angle of rotation from the center trajectory is within ±0.3 mm, it being noted that the $E_Y=0$ should be at the position of the center trajectory. Overall, it is considered that the effect is small.

It is considered that in the present model, the tilt of the Matsuda plate is preferably about 3.0° from the circulating trajectory plane when the incidence angle to the circulating trajectory plane is 1.642°. However, if the circulating trajectory providing a basis is different, the target angle of the Matsuda plate is varied. Therefore, the tilt of the Matsuda plate may be optimized according to each system.

As described in detail so far, according to the fifth aspect of the present invention, a helical-trajectory TOF-MS can be accomplished using laminated toroidal electric fields employing arcuate electrodes that can be machined at high machining accuracy and can be mass produced economically.

Furthermore, in the fifth aspect, the angle of the Matsuda plate can be optimized when the incidence angle of ions is within the range of 1.0° to 2.5° while satisfying the above-described requirements.

The invention claimed is:

1. A time-of-flight mass spectrometer comprising:

an ion source for ionizing a sample;

means for accelerating the ions in a pulsed manner;

a helical-trajectory time-of-flight mass analyzer which is composed of plural electric sector fields and in which the ions are made to travel in a helical trajectory;

an ion gate for selecting ions having a certain mass out of ions passed through the helical-trajectory time-of-flight mass analyzer;

means for fragmenting the selected ions;

a reflectron time-of-flight mass analyzer including a reflectron electric field; and a detector for detecting the ions passed through the reflectron time-of-flight mass analyzer.

2. A time-of-flight mass spectrometer as set forth in claim 1, wherein there is provided a second detector which is located between the helical-trajectory time-of-flight mass analyzer and the reflector electric field and which is capable of moving into and out of the trajectory of the ions.

3. A time-of-flight mass spectrometer as set forth in claim 1 or 2, wherein the sample is ionized in said ion source by illuminating a sample on a conductive sample plate with laser light.

4. A time-of-flight mass spectrometer as set forth in claim 3, wherein the sample is ionized in said ion source by a MALDI.

5. A time-of-flight mass spectrometer as set forth in claim 3, wherein said means for accelerating the ions uses delayed extraction technique.

6. A time-of-flight mass spectrometer comprising:

an ion source for ionizing a sample;

means for transporting the ions;

means for accelerating the ions in a pulsed manner in a direction orthogonal to a direction in which the ions are transported;

a helical-trajectory time-of-flight mass analyzer which is composed of plural electric sector fields and in which the ions are made to travel in a helical trajectory;

an ion gate for selecting ions having a certain mass out of ions passed through the helical-trajectory time-of-flight mass analyzer;

means for fragmenting the selected ions;

a reflectron time-of-flight mass analyzer including a reflectron electric field; and detection means for detecting the ions passed through the reflectron time-of-flight mass analyzer.

7. A time-of-flight mass spectrometer as set forth in claim 6, wherein there is provided a second detector which is located between the helical-trajectory time-of-flight mass analyzer and the reflector electric field and which is capable of moving into and out of the trajectory of the ions.

8. A time-of-flight mass spectrometer as set forth in claim 1 or 6, further comprising:

deflection means for deflecting the ions, the deflection means being located between the means for accelerating the ions in a pulsed manner and the helical-trajectory time-of-flight mass analyzer to adjust an angle of incidence of the ions entering the helical-trajectory time-of-flight mass analyzer.

9. A time-of-flight mass spectrometer as set forth in claim 1 or 6, wherein the means for fragmenting the ions is CID (collisionally induced dissociation) performed in a collisional cell filled with gas.

10. A method of time-of-flight mass spectrometry comprising the step of:

selecting only certain isotope peaks of precursor ions by a helical-trajectory time-of-flight mass analyzer using a time-of-flight mass analyzer as set forth in claim 1 or 6.

11. A method of time-of-flight mass spectrometry as set forth in claim 10, wherein said certain isotope peaks are monoisotopic ions of the precursor ions.

12. A time-of-flight mass spectrometer of a multi-turn type or helical-trajectory type as set forth in claim 1 or 6, further comprising an ion optical system capable of completely satisfying spatial and time focusing conditions whenever a revolution is made.

* * * * *